US012271204B1

(12) United States Patent
Garimella et al.

(10) Patent No.: US 12,271,204 B1
(45) Date of Patent: Apr. 8, 2025

(54) PREDICTING OCCUPANCY OF OBJECTS IN OCCLUDED REGIONS

(71) Applicant: Zoox, Inc., Foster City, CA (US)

(72) Inventors: Gowtham Garimella, Burlingame, CA (US); Marin Kobilarov, Mountain View, CA (US); Kai Zhenyu Wang, Foster City, CA (US)

(73) Assignee: Zoox, Inc., Foster City, CA (US)

( * ) Notice: Subject to any disclaimer, the term of this patent is extended or adjusted under 35 U.S.C. 154(b) by 384 days.

(21) Appl. No.: 17/081,203

(22) Filed: Oct. 27, 2020

(51) Int. Cl.
*G06N 20/00* (2019.01)
*G05D 1/00* (2006.01)
*G06V 20/58* (2022.01)

(52) U.S. Cl.
CPC ......... *G05D 1/0246* (2013.01); *G05D 1/0221* (2013.01); *G05D 1/0274* (2013.01); *G06N 20/00* (2019.01); *G06V 20/58* (2022.01)

(58) Field of Classification Search
CPC ............... G05D 1/0246; G05D 1/0221; G05D 1/0274; G05D 1/0088; G05D 2201/0213; G05D 1/0214; G05D 1/0257; G05D 1/024; G06N 20/00; G06N 3/045; G06N 3/08; G06N 3/044; G06N 3/088; G06N 3/084; G06V 20/58; B60W 30/0956; B60W 60/0027; B60W 60/0011; B60W 60/0015; B60W 2554/4029; B60W 50/0097; G08G 1/166; G08G 1/0112; G08G 1/167; G01C 21/3407; G01S 17/89; G01S 17/931; G01S 13/931

See application file for complete search history.

(56) References Cited

U.S. PATENT DOCUMENTS

| | | | |
|---|---|---|---|
| 10,037,613 B1 * | 7/2018 | Becker | G06T 7/277 |
| 10,349,011 B2 * | 7/2019 | Du | G06V 10/95 |
| 11,480,977 B2 * | 10/2022 | Cox | G08G 1/0112 |
| 2019/0086549 A1 * | 3/2019 | Ushani | G05D 1/0088 |
| 2019/0339706 A1 * | 11/2019 | Batur | G05D 1/0223 |

(Continued)

FOREIGN PATENT DOCUMENTS

| | | | | |
|---|---|---|---|---|
| KR | 2020069281 A * | 6/2020 | | B60R 21/34 |
| WO | WO-2020020650 A1 * | 1/2020 | | |

OTHER PUBLICATIONS

Jaccard et al., "Detection of concealed cars in complex cargo X-ray imagery using deep learning," Sep. 9, 2016 (Year: 2016).*

*Primary Examiner* — Adam R Mott
*Assistant Examiner* — Byron Xavier Kasper
(74) *Attorney, Agent, or Firm* — Lee & Hayes, P.C.

(57) ABSTRACT

Techniques are discussed for predicting an occupancy of visible region of an environment. For instance, a vehicle may generate sensor data representing an environment. The vehicle may then analyze the sensor data to determine an occluded region of the environment a visible region of the environment. Additionally, the vehicle may determine at least one prediction probability associated with occupancy of the visible region over a future period of time. In some instances, the vehicle determines the at least one prediction probability by inputting data representing at least the occluded region and the visible region into a machine learned model and receiving the at least one prediction probability from the machine learned model. Using the at least one prediction probability, the vehicle may then determine and perform one or more actions.

20 Claims, 8 Drawing Sheets

(56) References Cited

U.S. PATENT DOCUMENTS

| | | | |
|---|---|---|---|
| 2020/0090322 A1* | 3/2020 | Seo .................. | G06N 3/084 |
| 2020/0150665 A1* | 5/2020 | Refaat ............... | G05D 1/0221 |
| 2021/0004012 A1* | 1/2021 | Marchetti-Bowick ..................... | |
| | | | G05D 1/0221 |
| 2021/0027629 A1* | 1/2021 | Tao .................... | G06V 10/273 |
| 2021/0166340 A1* | 6/2021 | Nikola ............... | G01C 21/3837 |
| 2021/0201504 A1* | 7/2021 | Xu .................... | G05D 1/0221 |
| 2021/0389466 A1* | 12/2021 | Dimitrov ............ | G05D 1/0251 |
| 2022/0314968 A1* | 10/2022 | Horita ................ | G08G 1/16 |

\* cited by examiner

PREDICTING OCCUPANCY OF OBJECTS IN OCCLUDED REGIONS

BACKGROUND

An autonomous vehicle may utilize route planning methods, apparatuses, and systems to guide the autonomous vehicle through congested areas of an environment that include other objects, such as other vehicles (autonomous or otherwise), pedestrians, buildings, and/or the like. In some instances, a region of the environment for which the autonomous vehicle is navigating may be occluded by an object, which may cause problems for the autonomous vehicle while navigating through the environment. For example, the object may block the field of view of the autonomous vehicle such that the autonomous vehicle cannot detect whether another object (e.g., another vehicle or a pedestrian) is located within the occluded region and moving in a direction that may intersect with a trajectory of the autonomous vehicle.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

DETAILED DESCRIPTION

Figure 1:
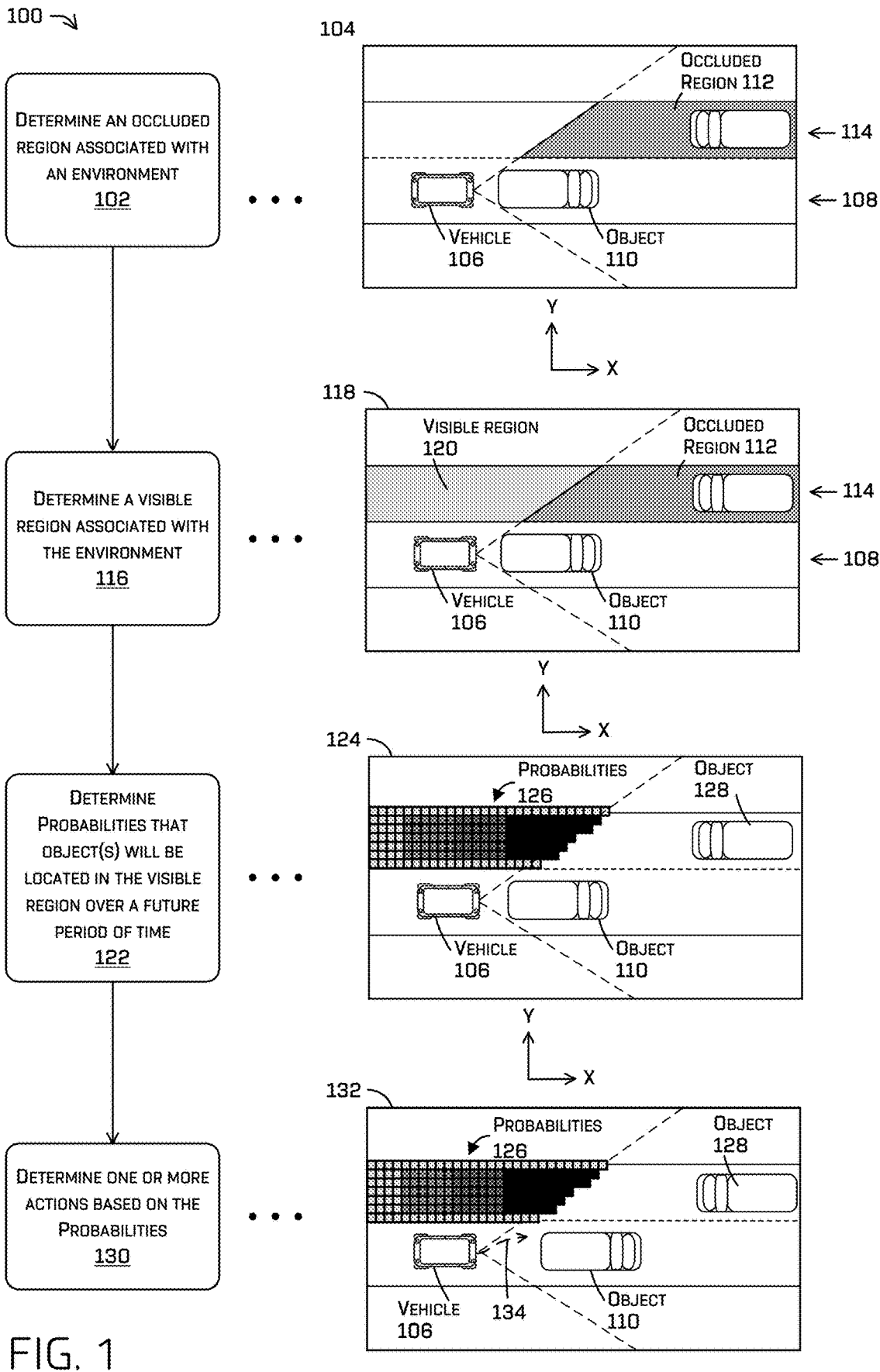
FIG. 1 is a pictorial flow diagram of an example process for determining prediction probabilities for a visible region of an environment, in accordance with embodiments of the disclosure.

An autonomous vehicle may utilize route planning methods, apparatuses, and systems to guide the autonomous vehicle through congested areas of an environment that include other objects, such as other vehicles, pedestrians, buildings, and/or the like. In some instances, a region of the environment for which the autonomous vehicle is navigating may be occluded by an object. This may cause problems for the autonomous vehicle while navigating through the environment. For example, the object may block the field of view of the autonomous vehicle such that the autonomous vehicle cannot detect another object (e.g., another vehicle or a pedestrian) that is located within the occluded region and moving in a direction may intersect with a trajectory of the autonomous vehicle.

As such, the application describes techniques for predicting an occupancy for visible regions of an environment over future periods of time. For instance, the autonomous vehicle may generate sensor data representing the environment for which the autonomous vehicle is navigating. Using the sensor data, the autonomous vehicle may determine at least one occluded region that is occluded by an object within the environment and at least one visible region that is not occluded by object(s) within the environment. The autonomous vehicle may then analyze the occluded region, the visible region, and other attributes associated with the autonomous vehicle and/or the environment in order to determine prediction probabilities. The prediction probabilities may be associated with an occupancy of the visible region over a future period of time. For example, the prediction probabilities may indicate a likelihood that various portions of the visible region will be occupied by object(s), that have yet to be detected by the autonomous vehicle, over the future period of time. In at least some such examples, the likelihood of occupancy may be represented as a spatially discretized grid with cells of the grid associated with corresponding likelihoods that an object will be present in that cell during a period (or range) of time in the future. The autonomous vehicle may then use the prediction probabilities while navigating through the environment.

For example, as the autonomous vehicle is navigating through the environment, the autonomous vehicle may generate the sensor data representing the environment. The sensor data can include, but is not limited to, lidar data, radar data, image data, time of flight data, sonar data, location data, and/or any other type of data that may be generated by one or more sensors. The autonomous vehicle may then analyze the sensor data to determine location(s) of static object(s) and/or location(s) of dynamic object(s) within the environment. Additionally, the autonomous vehicle may use the location(s) of the object(s) to determine both region(s) of the environment that are occluded by object(s), which are referred to as the occluded region(s), and region(s) of the environment that are not occluded by object(s), which are referred to as the visible region(s).

For example, the autonomous vehicle may determine a grid associated with the occluded region(s) and/or the visible region(s). Techniques such as ray casting may be used to determine which region(s) of the environment represented by the grid are occluded with respect to a location of the autonomous vehicle and which region(s) of the environment represented by the grid are not occluded with respect to the location of the autonomous vehicle. In some examples, different techniques for determining occlusion region(s) and/or visible region(s) may be used based on various sensor modalities. As a non-limiting example, ray casting may be used to determine occlusion region(s) and/or visible region(s) for lidar sensors, whereas image projections using camera matrices may be used for determining occlusion region(s) and/or visible region(s) of image sensors. The grid may be three-dimensional and may represent a prediction of object(s) in voxels that describe volume(s) of the object(s) in the environment. Techniques for generating a grid may be found, for example, in U.S. patent application Ser. No. 16/011,436 titled "Occlusion Aware Planning" and filed Jun. 18, 2018, which is incorporated by reference herein in its entirety. Further, techniques for determining occluded regions and predicted occluded regions may be found, for example, in U.S. patent application Ser. No. 16/246,208 titled "Occlusion Prediction and Trajectory Evaluation" and filed Jan. 11, 2019, and U.S. patent application Ser. No. 16/399,743, titled "Predicting an Occupancy Associated with Occluded Region" and filed Apr. 30, 2019, which are incorporated by reference herein in their entirety.

In some instances, the occluded region(s) and/or the visible region(s) may be represented in the environment in a top-down representation of the environment, for example, which may comprise other sensor data captured by the autonomous vehicle.

In some cases, the sensor data may be provided to a perception system configured to determine a type of an object (e.g., vehicle, pedestrian, bicycle, animal, parked car, tree, building, and the like) in the environment. Further, the perception system may determine, based on the sensor data, movement information about the object in the environment. The sensor data and any data based on the sensor data may be represented in a top-down view (e.g., a top-down image having one or more channels) of the environment.

For example, the image may represent an object as a two-dimensional bounding box representing the location of the object in the environment as well as an extent of the object (e.g., the length and width of the object), and/or a classification of the object (e.g., vehicle, pedestrian, and the like). In some examples, additional image channels may comprise velocities, accelerations, uncertainties associated therewith, and the like. Movement information such as velocity information may be represented as a velocity vector associated with the bounding box, although other representations are contemplated. In some examples, an additional image channel may comprise information associated with an occluded region, such as a size, shape, location in the environment, and/or the like. In some examples, an additional image channel may also comprise information associated with a visible region, such as a size, shape, location in the environment, and/or the like. Additionally, the image may represent, but is not limited to, one or more of: road network information (e.g., semantic labels indicating lanes, crosswalks, stop lines, lane dividers, stop signs, intersections, traffic lights, and the like); traffic light status (e.g., red light, yellow light, green light, etc.); a bounding box associated with the object, a velocity of the object in an x-direction, a y-direction, and/or a z-direction: an acceleration of the object in an x-direction and a y-direction: a blinker status of the object (e.g., left-turn, right-turn, braking, reverse, hazards, no lights, etc.); and the like.

The autonomous vehicle may then input data into a machine learned model that is trained to output prediction probabilities associated with visible region(s) of the environment. The data may represent one or more of the top-down representation of the environment, the occlusion region(s), the visible region(s), attribute(s) associated with the environment (e.g., location(s) of object(s) within the environment, velocity(ies) associated with the object(s), a speed limit associated with the road the autonomous vehicle is navigating, etc.), attribute(s) associated with the autonomous vehicle (e.g., a location of the autonomous vehicle, a velocity associated with the autonomous vehicle, and acceleration associated with the autonomous vehicle, etc.), weather conditions, a type of roadway that the autonomous vehicle is navigating (e.g., a freeway, a parking lot, a downtown road, etc.) a time of day, month, year, etc., and/or any other information. In some examples, the machine learned model may then output a heat map representing prediction probabilities associated with discrete portions (e.g., cells) of the visible region. As described herein, the prediction probabilities may represent likelihoods that those portions of the visible region will be occupied by object(s) over a future period of time. The future period of time may include, but is not limited to, 1 second, 2 seconds, 3 seconds, 4 seconds, 5 seconds, 10 seconds, and/or any other period of time.

In some examples, the autonomous vehicle may then determine one or more actions to perform based on the prediction probabilities associated with a visible region. In some instances, the visible region is along the current trajectory of the autonomous vehicle. For example, if the autonomous vehicle is navigating along a trajectory that includes a crosswalk, the visible region may include at least a portion of the crosswalk. The one or more actions may include, but are not limited to, continuing along a current trajectory of the autonomous vehicle, modifying the current trajectory, selecting a new trajectory, changing a velocity of the autonomous vehicle, changing an acceleration of the autonomous vehicle, stopping the autonomous vehicle, and/or any other action that the autonomous vehicle may perform. Additionally, the autonomous vehicle may repeat the processes described above while continuing to navigate through the environment.

Although the above examples describe determining prediction probabilities associated with occluded object(s) occupying the visible region over the future period of time, in other examples, similar processes may be performed to determine prediction probabilities associated with visible object(s) occupying the visible region over the future period of time. For example, similar processes may be performed to determine if an object, which is located in a first visible region and visible to the autonomous vehicle, will occupy a second, different visible region of the future period of time. When performing such processes, the autonomous vehicle may use attribute(s) associated with the object, such as the type of object, the velocity of the object, the trajectory of the object, and/or the like.

As introduced above, data associated with the visible region, the occluded region, attributes associated with the autonomous vehicle, and/or attributes associated with the environment may be input to a machine learned model trained to output prediction probabilities associated with the visible region(s). In some examples, a system may train the machine learned model based on log data captured by vehicle(s) as the vehicle(s) traversed environment(s). For example, a vehicle may include sensors, such as one or more lidar sensor(s), camera(s), radar(s), time-of-flight sensor(s), and/or any other type of sensor. The vehicle may use the sensors to determine visible region(s) and/or occluded region(s) at an initial time. Next, the vehicle may use the sensors to detect location(s) of new object(s) within the visible region(s) over the future period of time. In some instances, the new object(s) were not originally detected by the vehicle at the initial time because the new object(s) were located within the occluded region(s) (e.g., the new object(s) were occluded by other, detected object(s)).

Thus, in some examples, data captured of a previously visible region and/or previously occluded region, as well as location(s) of new object(s) that enter the visible region, may represent ground truth information or known information, which may verify whether an object, that was occupying an occluded region, enters the visible region over the future period of time. Attribute(s) may be determined based on the log data, and the log data and/or attribute(s) may be used as training data to train the machine learning model to determine prediction probabilities. For example, the training data may be input into the machine learning model where a known result (e.g., a ground truth, such as the known "future" attributes) may be used to adjust weights and/or parameters of the machine learning model to minimize an error.

In addition to, or alternatively from inputting the data described above into the machine learned model, in some examples, the system may artificially generate the ground truth data for training the machine learned model. For instance, the system may use the data captured by the vehicle(s) and generate new occluded region(s) by artificially occluding region(s) of the environment that were originally visible to the vehicle(s). This may help improve the training of the machine learned model since the system knows whether one or more objects were actually located within the artificially occluded region(s). Additionally, the system already knows attributes associated with the object(s) (e.g., the type(s) of object(s), the velocity(ies) of the object(s), the trajectory(ies) of the object(s), etc.). As such, the system is able to input, into the machine learned model, data representing the attributes.

In some instances, when training the machine learned model, the system may use one or more assumptions for new object(s) detected within visible region(s). For a first example, when a group of pedestrians are moving together, such as crossing a street using a crosswalk, the vehicle may determine that the same person is detected as a new person multiple time (e.g., the person is visible to the vehicle at a first time, the person is occluded from the vehicle by another person at a second time, the person is again visible to the vehicle at a third time, etc.). As such, in order to avoid detecting the same new object multiple times, the system may set a first assumption that if a new object is detected and the distance between the new object and an already detected object is less than a threshold (e.g., 0.1 meters, 0.2 meters, 0.5 meters, etc.), the new object is merged with the already detected object until the two objects are separated. Furthermore, and again to avoid detecting the same new object multiple times, the system may set a second assumption that avoids setting a detected object as a new object if the object is detected for less than a threshold period of time (e.g., 1 millisecond, 10 milliseconds, 1 second, etc.).

For a second example, a vehicle may classify a static object as a dynamic object, such as a pedestrian. As such, and in order to avoid this type of mistake in the classification, the system may set a third assumption that avoids predicting stationary new objects. In other words, the system may not input that stationary objects are newly detected when training the machine learned model.

The techniques discussed herein may improve a functioning of a computing device, such as a computing device of an autonomous vehicle, in a number of ways. For instance, determining prediction probabilities associated with an occupancy of a visible region over a future period of time may allow the autonomous vehicle to better plan trajectories that ensure safe and comfortable movement through an environment. For example, if a prediction probability associated with the visible region indicates a high likelihood that the visible region will be occupied by object(s) during the future period of time, the autonomous vehicle may perform one or more first actions, such as slowing down or changing a trajectory. Alternatively, if a prediction probability associated with the visible region indicates a low likelihood that the visible region will be occupied by object(s) during the future period of time, the autonomous vehicle may perform one or more second actions, such as continuing along a trajectory. In other words, the autonomous vehicle may take extra safety measures when navigating through a visible region that is located proximate to an occluded region for which occluded object(s) may be located.

The techniques described herein may be implemented in a number of ways. Example implementations are provided below with reference to the following figures. Although discussed in the context of an autonomous vehicle, the methods, apparatuses, and systems described herein may be applied to a variety of systems (e.g., a sensor system or a robotic platform), and are not limited to autonomous vehicles. In one example, similar techniques may be utilized in driver controlled vehicles in which such a system may provide an indication of whether it is safe to perform various maneuvers. In another example, the techniques may be utilized in a manufacturing assembly line context, or in an aerial surveying context. Additionally, the techniques described herein may be used with real data (e.g., captured using sensor(s)), simulated data (e.g., generated by a simulator), or any combination of the two.

FIG. 1 is a pictorial flow diagram of an example process 100 for determining prediction probabilities for a visible region of an environment, in accordance with embodiments of the disclosure. At operation 102, the process 100 may include determining an occluded region associated with an environment. For instance, an example 104 (which may show the environment) illustrates a vehicle 106 navigating along a first lane 108 of a road. While navigating, the vehicle 106 may generate sensor data representing the environment. The vehicle 106 may then analyze the sensor data in order to determine a location of an object 110, which is visible to the vehicle 106, within the environment. The vehicle 106 may then use the location of the object 110 in order to determine the occluded region 112.

In some examples, the occluded region 112 represents a portion of the environment which may be blocked by the object 110, thus preventing various sensors of the vehicle 106 from obtaining information about the environment. In some examples, the occluded region 112 may be determined using ray casting techniques. For example, ray(s) may be projected from a point associated with the vehicle 106 to determine region(s) of the environment that are observable by one or more sensors of the vehicle 106. A region that is not observable to one or more sensors of the vehicle 106 may be represented as the occluded region 112. In some examples, region(s) of the environment (or an occlusion grid) may be associated with metadata indicating a state of region, such as whether the region represents free space, is occupied by an object in the environment, represents an occluded region, is unknown, and the like.

Although the example of FIG. 1 illustrates the occluded region 112 as only including the portion of the environment that includes a second, opposite lane 114 of the road, in other examples, the occluded region 112 may include all of the portions of the environment that are occluded by the object 110. Additionally, the occluded region 112 is generally depicted as being in an x-direction and a y-direction for clarity in the example 104. However, in other examples, the occluded region 112 may also represent occlusion information associated with a z-direction component, which may correspond to a height of the object 110. In another example, occlusion information may be associated with a z-direction component corresponding to terrain of the surrounding environment, such as hills or valleys, or height of objects that may be occluded but are relevant to trajectory determinations, such as stop lights or train crossing signals.

At operation 116, the process 100 may include determining a visible region associated with the environment. For instance, an example 118 illustrates the vehicle 106 analyzing the sensor data in order to determine the visible region 120 associated with the environment. In some examples, the visible region 120 represents a portion of the environment that is not blocked by an object and, as such, various sensors of the vehicle 106 may obtain information about the environment. In some examples, the visible region 120 is determined using one or more of the processes described above, such as by using ray casting techniques, outputting all region(s) that are visible and occluded, sending sensor data to one or more other device(s) that determine the occluded and visible regions, and/or the like. For example, ray(s) may be projected from a point associated with the vehicle 106 to determine the region(s) of the environment that are observable by one or more sensors of the vehicle 106. At least a region may be represented as the visible region 120.

Although the example of FIG. 1 illustrates the visible region 120 as only including the portion of the environment that includes the second lane 114 of the road, in other examples, the visible region 120 may include all of the portions of the environment that are visible to the vehicle 106. Additionally, the visible region 120 is generally depicted as being in an x-direction and ay-direction for clarity in the example 118. However, in other examples, the visible region 120 may also represent occlusion information associated with a z-direction component.

At operation 122, the process 100 may include determining probabilities that object(s) will be located within the visible region over a future period of time. An example 124 illustrates probabilities 126, which may represent a likelihood that an object, such as an object 128, will be located at various portions of the visible region 120 over the future period of time. In some examples, the operation 122 may include representing the visible region 120 as a top-down image representing the environment including the occluded region 112 and the visible region 120. In some examples, the vehicle 106 may determine the probabilities 126 by inputting data into a machine learned model and receiving the probabilities 126 as output from the machine learned mode. The data may include, but is not limited to, data representing the top-down image, data representing the occluded region 112, data representing the visible region 120, data representing attribute(s) (e.g., location, velocity, acceleration, etc.) associated with the vehicle 106, data representing attribute(s) associated with the environment (e.g., the location, velocity, and/or acceleration of the object 110, the time of day, the weather, etc.), and/or the like.

In some examples, the data input into the machine learned model is accumulated and/or aggregated over a period of time. The period of time may include, but is not limited to, one second, two seconds, five seconds, ten second, and/or any other period of time. For example, the vehicle may input, into the machine learned model, first data representing the environment at a first time that is within the period of time, second data representing the environment at a second time that is within the period of time, third data representing the environment at a third time that is within the period of time, and/or the like. The accumulated and/or aggregated data may provide a better sense of the actual environment for which the vehicle 106 is navigating. For example, the accumulated and/or aggregated data may provide more information about the location(s) of visible region(s), the location(s) of occluded region(s), location(s) of object(s), attribute(s) associated with the object(s), attribute(s) associated with the vehicle 106, and/or the like. The machine learned model may use this additional information to better determine the probabilities 126 for the visible region 120.

For the purposes of illustration, a color (or degree of darkness) of a cell of the probabilities 126 may represent a probability (and/or likelihood) associated with the cell that an object will be located at the cell during the future period of time. For example, a white color may illustrate a lowest probability, a light gray color may illustrate a low probability, a dark gray color may illustrate a medium probability, and a black color may illustrate a high probability. Of course, the example 124 is illustrative and each cell may be associated with an individual probability value. In some instances, the probabilities 126 associated with the example 124 (which may also be referred to as a discretized probability distribution 126 or a heat map 126) may collectively add up to a probability of 1.

Examples of generating one or more discretized probability distributions are discussed throughout this disclosure. Further, examples of generating one or more heat maps are discussed in U.S. patent application Ser. No. 16/151,607 titled "Trajectory Prediction on Top-Down Scenes" filed Oct. 4, 2018. Application Ser. No. 16/151,607 is herein incorporated by reference, in its entirety.

At operation 130, the process 100 may include determining one or more actions based on the probabilities. For instance, in an example 132, the vehicle 106 may determine the one or more actions based on the probabilities 126. The one or more actions may include, but are not limited to, continuing along a trajectory of the vehicle 106, modifying the trajectory, selecting a new trajectory, changing a velocity of the vehicle 106, changing an acceleration of the vehicle 106, and/or any other action. In the example of FIG. 1, and since there are high probabilities 126 that object(s) may be located within the visible region 120 over the future period of time, the vehicle 106 may determine to perform a trajectory 134, which includes moving closer to the second lane 114, but while staying within the first lane 108. This way, the vehicle 106 is able to increase the visible region 120 within the second lane 114 such that the vehicle 106 is able to better determine whether an object is traveling down the second lane 114, which is illustrated in the example of FIG. 2.

Figure 2:
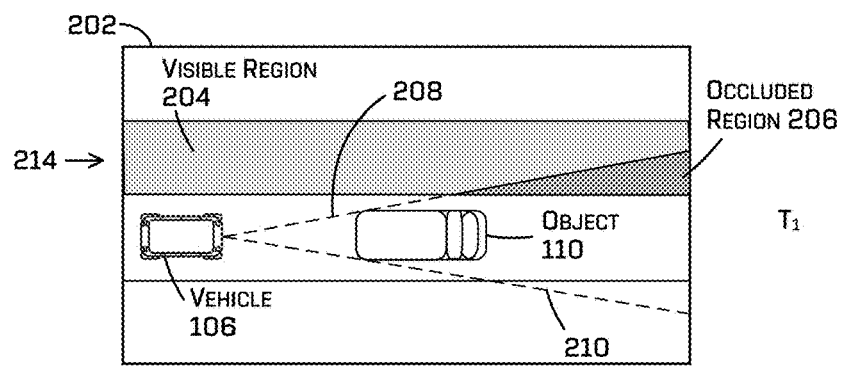
FIG. 2 illustrates examples of determining occluded regions and visible regions of an environment while navigating along a trajectory, in accordance with embodiments of the disclosure.
Figure 2:
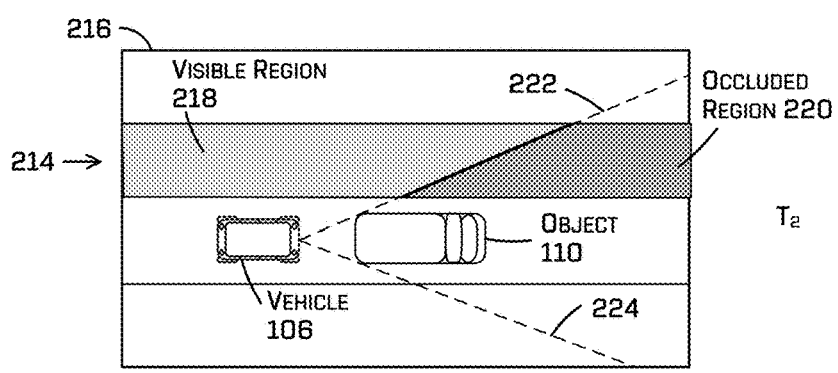
Figure 2:
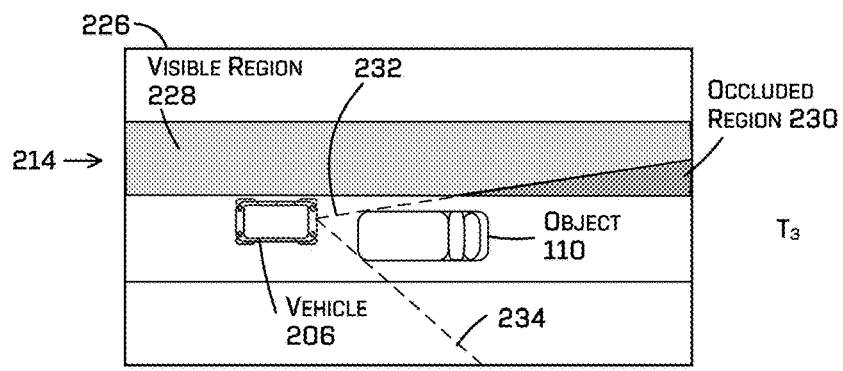

For example, FIG. 2 illustrates examples 200 of determining visible regions and occluded regions while navigating along a trajectory, in accordance with embodiments of the disclosure. An example 202 illustrates the vehicle 106 navigating along the environment and towards the object 110 at a first time ($T_1$). While navigating, the vehicle 106 may determine at least a first visible region 204 and a first occluded region 206 within the environment. In some instances, the vehicle 106 may determine the first visible region 204 and the first occluded region 206 using ray casting techniques, which is illustrated by 208 and 210. Although the example 202 only illustrates determining the first visible region 204 and the first occluded region 206 with respect to an opposing lane 214 of the road, in other examples, the vehicle 106 may determine an entirety of the visible region and an entirety of the occluded region within the environment.

An example 216 illustrates the vehicle 106 navigating along the environment and closer to the object 110 at a second time ($T_2$). While navigating, the vehicle 106 may determine at least a second visible region 218 and a second occluded region 220 within the environment. In some instances, the vehicle 106 may determine the second visible region 218 and the second occluded region 220 using ray casting techniques, which is illustrated by 222 and 224. Although the example 216 only illustrates determining the second visible region 218 and the second occluded region 220 with respect to the opposing lane 214 of the road, in other examples, the vehicle 106 may determine an entirety of the visible region and an entirety of the occluded region within the environment.

As shown in the example of FIG. 2, since the vehicle 106 is closer to the object 110 at the second time, the second visible region 218 is different than the first visible region 204 and the second occluded region 220 is different that the first occluded region 206. It is because of this that, at an example 226, the vehicle 106 may navigate closer to the opposing lane 214 within the environment at a third time ($T_3$). While navigating, the vehicle 106 may determine at least a third visible region 228 and a third occluded region 230 within the environment. In some instances, the vehicle 106 may determine the third visible region 228 and the third occluded region 230 using ray casting techniques, which is illustrated by 232 and 234. Although the example 226 only illustrates determining the third visible region 228 and the third occluded region 230 with respect to the opposing lane 214 of the road, in other examples, the vehicle 106 may determine an entirety of the visible region and an entirety of the occluded region within the environment.

As shown by the example 226, since the vehicle 106 is closer to the opposing lane 214 at the third time, the third visible region 228 is different than the second visible region 218 and the third occluded region 230 is different that the second occluded region 220. More specifically, a larger portion of the opposing lane 214 of the road is now visible to the vehicle 106. This may increase the safety when the vehicle 106 is attempting to use the opposing lane 214 of the road, such as to pass the object 110.

Figure 3:
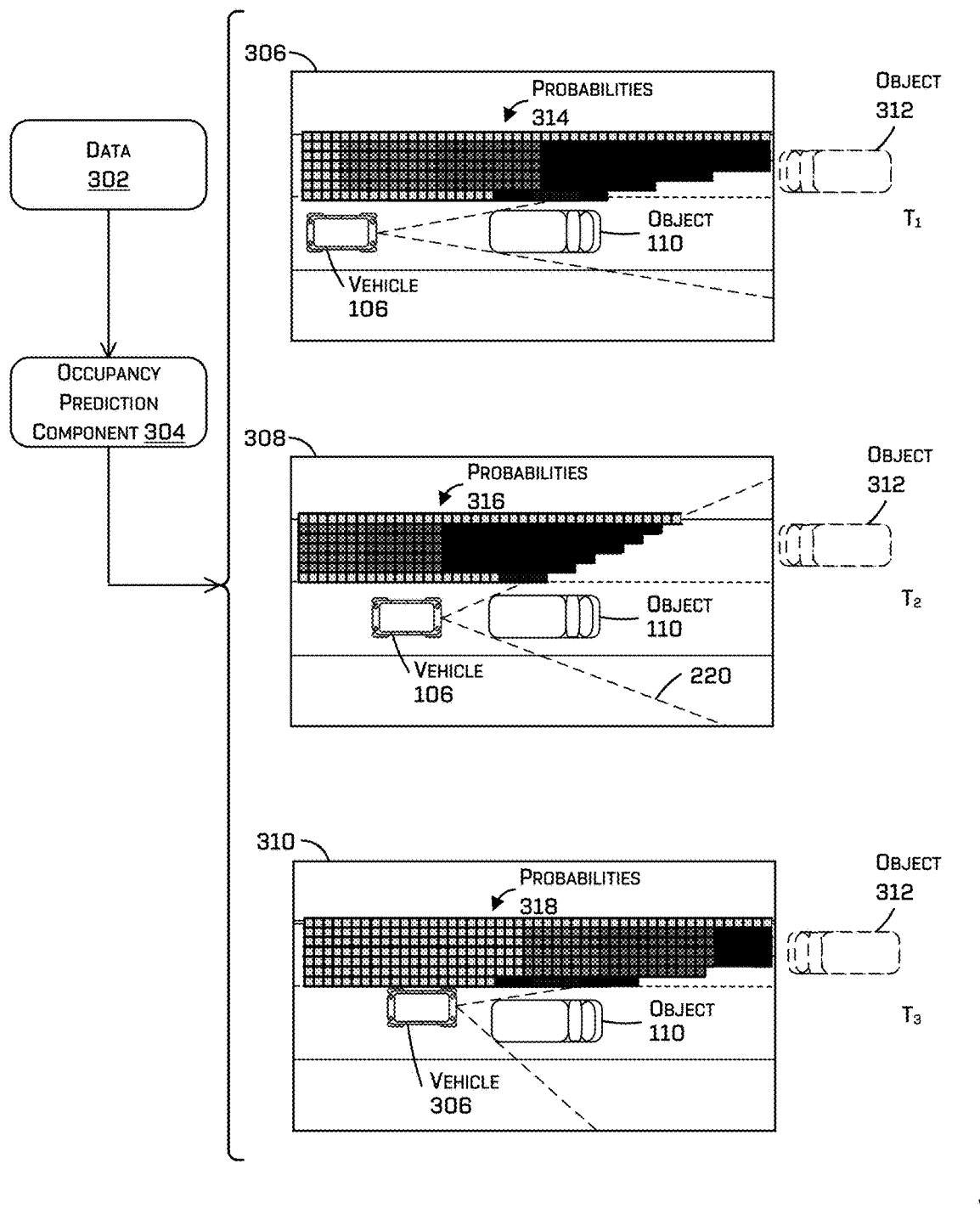
FIG. 3 illustrates examples of determining prediction probabilities for visible regions of an environment over a future period of time, in accordance with embodiments of the disclosure.

FIG. 3 illustrates an example 300 of determining prediction probabilities associated with occupancies of visible regions over a period of time, in accordance with embodiments of the disclosure. In some instances, data 302 associated with the examples 202, 216, and 226 may be input into an occupancy prediction component 304. In some examples, the data 302 may comprise top-down representations of the examples 202, 216, and/or 226, which may include representations of the visible regions 204, 218, and 228 and occluded regions 206, 220, and 230, respectively, as well as any data or predicted data about the vehicle(s), object(s), map data, and/or the like.

The occupancy prediction component 304 may receive the data 302 and then output prediction probabilities for the first time (or first range of time), the second time (or second range of time), and the third time (or third range of time). The prediction probabilities may represent likelihoods that an object 312, which may be occluded from the vehicle 106 by the object 110, will occupy the visible regions 204, 218, and 228 over the future period of time. For example, the prediction probabilities may include data 306, 308, and 310 representing prediction probabilities 314, 316, and 318, respectively. In some instances, the prediction probabilities 314 may represent a heat map indicative of a probability and/or likelihood that object(s) will occupy portions of the first visible region 204 during a first future time period that is after the first time. In some instances, the prediction probabilities 316 may represent a heat map indicative of a probability and/or likelihood that object(s) will occupy portions of the second visible region 218 during a second future time period that is after the second time. In some instances, the prediction probabilities 318 may represent a heat map indicative of a probability and/or likelihood that object(s) will occupy portions of the third visible region 228 during a third future time period that is after the third time.

In the example of FIG. 3, when the vehicle 106 navigates closer to the opposing lane 214 at the third time, the third visible region 228 associated with the vehicle 106 extends farther down the opposing lane 214 than the second visible region 218. As such, the vehicle 106 is able to determine the prediction probabilities 318 that also extend farther down the opposing lane 214. Additionally, at each time, the prediction probabilities 314, 316, and 318 show that there is a high probability that object(s) will be located in the visible regions 204, 218, and 228 that are located next to the object 110. This may be because the machine learned model determines that there is a high probability that a pedestrian will exit the stopped object 110 and/or that there is a high probability of a pedestrian being located next to the stopped object 110.

It should be noted that, while the example of FIG. 3 describes the vehicle 106 as actually navigating over the period of time, in other examples, the vehicle 106 may be simulating one or more of the times. For example, the vehicle 106 perform a simulation for the second time and the third time. The simulation may be based on a selected trajectory for the vehicle 106. This way, the vehicle 106 is able to analyze the trajectory using the simulation and before the vehicle 106 actually performs the trajectory.

Figure 4:
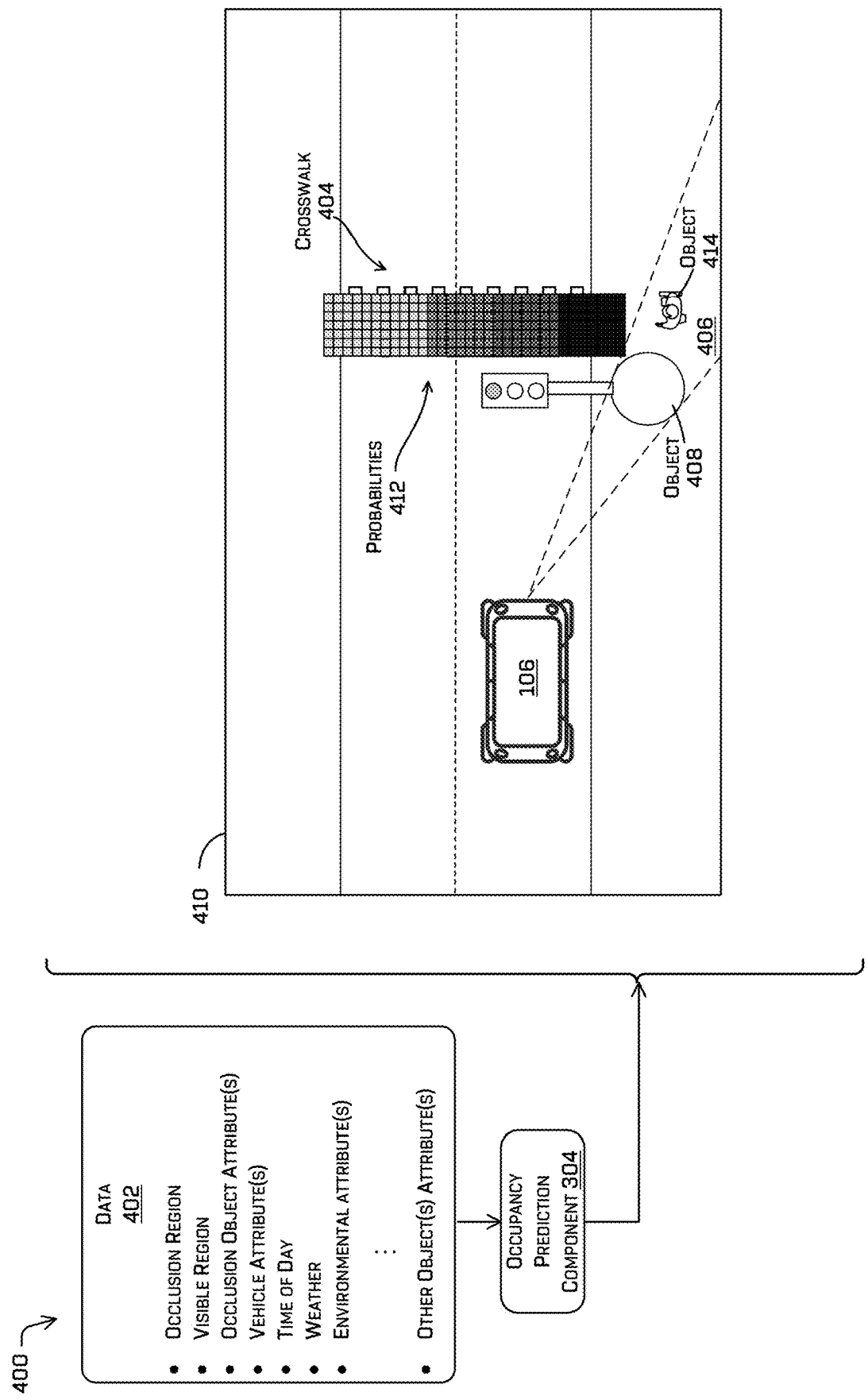
FIG. 4 illustrates an example of determining prediction probabilities associated with a visible region of an environment, where the prediction probabilities are determined using attribute(s), in accordance with embodiments of the disclosure.

FIG. 4 illustrates another example 400 of determining prediction probabilities associated with a visible region, where the prediction probabilities are determined using inputted data, in accordance with embodiments of the disclosure. In the example of FIG. 4, the vehicle 106 may be navigating along a roadway and approaching a crosswalk 404. While navigating, the vehicle 106 may generate sensor data and analyze the sensor data, using the processes described herein, to determine an occluded region 406 that is caused by an object 408 (e.g., a traffic light pole). The vehicle 106 may also analyze the sensor data, using the processes described herein, to determine a visible region of the region. In the example of FIG. 4, the visible region may correspond to the crosswalk 404. However, in other examples, the visible region may correspond to more than just the crosswalk 404.

The vehicle 106 may then input the data 402 into the occupancy prediction component 304. As shown, the data 402 may include, but is not limited to, data representing the occlusion region, data representing the visible region, data representing occlusion object attributes (e.g., classification, location, velocity, acceleration, size, etc.) associated with the object 408, data representing vehicle attribute(s) (e.g., location, velocity, acceleration, trajectory, etc.), data representing environmental attribute(s) (e.g., data representing the time of day, data representing the weather, etc.), and data representing attribute(s) (e.g., traffic rules, states of traffic lights, etc.) for other object(s) that are located within environment and visible to the vehicle 106. In response to inputting the data 402, the occupancy prediction component 304 may output data 410 representing the prediction probabilities 412.

As shown in the example of FIG. 4, the data 410 indicates that there is a high probability that another object (e.g., the object 414, which is located within the occluded region 406 and has yet to be detected by the vehicle 106) will enter a first portion of the visible region that is close to the object 408 over the future period of time. This may be because the first portion of the visible region is close to the object 408 and as such, if another object were located within the occluded region 406, the object will likely at least enter the first portion of the visible region to cross the road.

The data 410 also indicates that there is a medium probability that another object (e.g., the object 414) will enter a second portion of the visible region, which is past the first portion of the visible region along the crosswalk, over the future period of time. This may be because the second portion of the visible region is farther from the object 408 than the first portion of the visible region and as such, if another object were located within the occluded region 406, the object will be less likely to navigate all the way to the second portion of the visible region with the vehicle 106 approaching.

Furthermore, the data 410 indicates that there is a low probability that another object (e.g., the object 414) will enter a third portion of the visible region, which is past the second portion of the visible region along the crosswalk, over the future period of time. This may be because the third portion of the visible region is farther from the object 408 than the second portion of the visible region and as such, if another object were located within the occluded region 406, the object will be even less likely to navigate all the way to the third portion of the visible region with the vehicle 106 approaching.

Finally, the data 410 indicates that there is the lowest probability that another object (e.g., the object 414) will enter a fourth portion of the visible region, which is past the third portion of the visible region along the crosswalk, over the future period of time. This may be because the fourth portion of the visible region is farther from the object 408 than the third portion of the visible region and as such, if another object were located within the occluded region 406, the object will be unlikely to navigate all the way to the fourth portion of the visible region with the vehicle 106 approaching.

Figure 5:
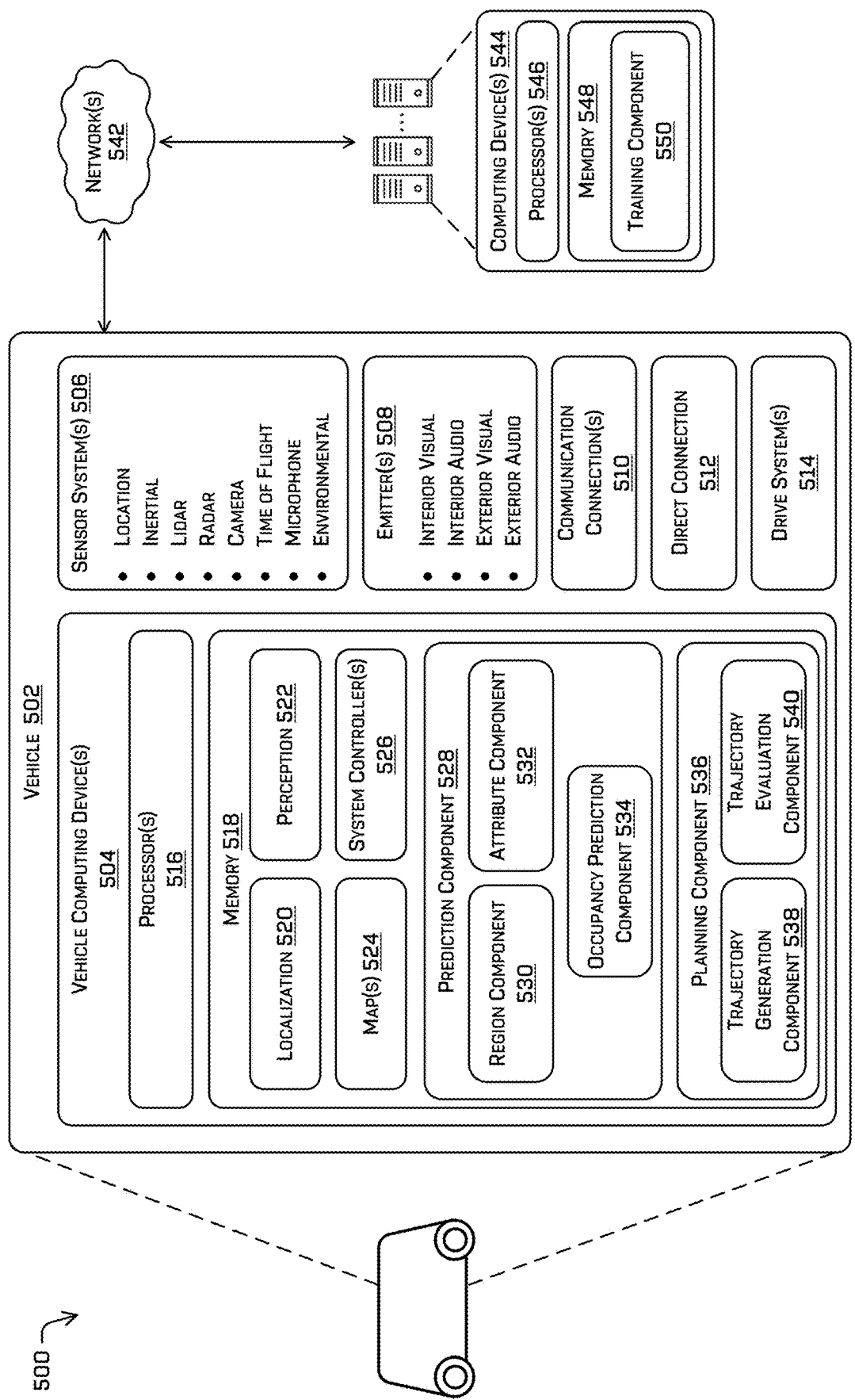
FIG. 5 depicts a block diagram of an example system for implementing the techniques described herein, in accordance with embodiments of the disclosure.

FIG. 5 depicts a block diagram of an example system 500 for implementing the techniques described herein. In at least one example, the system 500 may include a vehicle 502, which may correspond to the vehicle 106 of FIGS. 1-4.

The example vehicle 502 may be a driverless vehicle, such as an autonomous vehicle configured to operate according to a Level 5 classification issued by the U.S. National Highway Traffic Safety Administration, which describes a vehicle capable of performing all safety-critical functions for the entire trip, with the driver (or occupant) not being expected to control the vehicle at any time. In such examples, because the vehicle 502 may be configured to control all functions from start to completion of the trip, including all parking functions, it may not include a driver and/or controls for driving the vehicle 502, such as a steering wheel, an acceleration pedal, and/or a brake pedal. This is merely an example, and the systems and methods described herein may be incorporated into any ground-borne, airborne, or waterborne vehicle, including those ranging from vehicles that need to be manually controlled by a driver at all times, to those that are partially or fully autonomously controlled.

The vehicle 502 may include vehicle computing device(s) 504, one or more sensor systems 506, one or more emitters 508, one or more communication connections 510, at least one direct connection 512, and one or more drive systems 514.

The vehicle computing device(s) 504 may include processor(s) 516 and memory 518 communicatively coupled with the processor(s) 516. In the illustrated example, the vehicle 502 is an autonomous vehicle: however, the vehicle 502 could be any other type of vehicle or robotic platform. In the illustrated example, the memory 518 of the vehicle computing device(s) 504 stores a localization component 520, a perception component 522, one or more maps 524, one or more system controllers 526, a prediction component 528 comprising a region component 530, an attribute component 532, and an occupancy prediction component 535 (which may be similar to, and/or include, the occupancy prediction component 304), and a planning component 536 comprising a trajectory generation component 538 and a trajectory evaluation component 540. Though depicted in FIG. 5 as residing in the memory 518 for illustrative purposes, it is contemplated that the localization component 520, the perception component 522, the map(s) 524, the system controller(s) 526, the prediction component 528, the region component 530, the occupancy prediction component 534, the attribute component 532, the planning component 536, the trajectory generation component 538, and the trajectory evaluation component 540) may additionally, or alternatively, be accessible to the vehicle 502 (e.g., stored on, or otherwise accessible by, memory remote from the vehicle 502).

In at least one example, the localization component 520 may include functionality to receive data from the sensor system(s) 506 to determine a position and/or orientation of the vehicle 502 (e.g., one or more of an x-, y-, z-position, roll, pitch, or yaw). For example, the localization component 520 may include and/or request/receive a map of an environment and may continuously determine a location and/or orientation of the autonomous vehicle within the map. In some instances, the localization component 520 may utilize SLAM (simultaneous localization and mapping), CLAMS (calibration, localization and mapping, simultaneously), relative SLAM, bundle adjustment, non-linear least squares optimization, or the like to receive image data, lidar data, radar data, time of flight data, IMU data, GPS data, wheel encoder data, and the like to accurately determine a location of the autonomous vehicle. In some instances, the localization component 520 may provide data to various components of the vehicle 502 to determine an initial position of an autonomous vehicle for generating a trajectory, as discussed herein.

In some instances, and in general, the perception component 522 may include functionality to perform object detection, segmentation, and/or classification. In some examples, the perception component 522 may provide processed sensor data that indicates a presence of an entity that is proximate to the vehicle 502 and/or a classification of the entity as an entity type (e.g., car, pedestrian, cyclist, animal, building, tree, road surface, curb, sidewalk, stoplight, stop sign, unknown, etc.). In additional or alternative examples, the perception component 522 may provide processed sensor data that indicates one or more attributes associated with a detected entity (e.g., a tracked object) and/or the environment in which the entity is positioned. In some examples, attributes associated with an entity may include, but are not limited to, an x-position (global and/or local position), a y-position (global and/or local position), a z-position (global and/or local position), an orientation (e.g., a roll, pitch, yaw), an entity type (e.g., a classification), a velocity of the entity, an acceleration of the entity, an extent of the entity (size), etc. Attributes associated with the environment may include, but are not limited to, a presence of another entity in the environment, a state of another entity in the environment, a time of day, a day of a week, a season, a weather condition, an indication of darkness/light, etc.

The memory 518 may further include the map(s) 524 that may be used by the vehicle 502 to navigate within the environment. For the purpose of this discussion, a map may be any number of data structures modeled in two dimensions, three dimensions, or N-dimensions that are capable of providing information about an environment, such as, but not limited to, topologies (such as intersections), streets, mountain ranges, roads, terrain, and the environment in general. In some instances, a map may include, but is not limited to: texture information (e.g., color information (e.g., RGB color information, Lab color information, HSV/HSL color information), and the like), intensity information (e.g., lidar information, radar information, and the like); spatial information (e.g., image data projected onto a mesh, individual "surfels" (e.g., polygons associated with individual color and/or intensity)), reflectivity information (e.g., specularity information, retroreflectivity information, BRDF information, BSSRDF information, and the like). In one example, a map may include a three-dimensional mesh of the environment. In some instances, the map may be stored in a tiled format, such that individual tiles of the map represent a discrete portion of an environment, and may be loaded into working memory as needed. In at least one example, the one or more maps 524 may include at least one map (e.g., images and/or a mesh).

In some examples, the vehicle 502 may be controlled based at least in part on the map(s) 524. That is, the map(s) 524 may be used in connection with the localization component 520, the perception component 522, the prediction component 528, and/or the planning component 536 to determine a location of the vehicle 502, identify objects in an environment, and/or generate routes and/or trajectories to navigate within an environment.

In some examples, the map(s) 524 may be stored on a remote computing device(s) (such as the computing device(s) 544) accessible via network(s) 542. In some examples, multiple maps 524 may be stored based on, for example, an attribute (e.g., type of entity, time of day, day of week, season of the year, etc.). Storing multiple maps 524 may have similar memory requirements, but may increase the speed at which data in a map may be accessed.

In at least one example, the vehicle computing device(s) 504 may include the system controller(s) 526, which may be configured to control steering, propulsion, braking, safety, emitters, communication, and other systems of the vehicle 502. These system controller(s) 526 may communicate with and/or control corresponding systems of the drive system(s) 514 and/or other components of the vehicle 502.

In general, the prediction component 528 may include functionality to generate predicted information associated with objects and/or occluded regions in an environment. In some examples, the prediction component 528 may be implemented to predict locations of occlusions in an environment based on movement of an object and/or predicted location(s) of the vehicle 502 along a candidate trajectory. In some examples, the techniques discussed herein may be implemented to predict locations of objects (e.g., a vehicle, a pedestrian, and the like) as the vehicle traverses an environment. In some examples, the prediction component 528 may generate one or more predicted trajectories for such target objects based on attributes of the target object and/or other objects proximate the target object.

The region component 530 may include functionality to determine one or more occluded regions or one or more visible regions associated with an environment. For example, the region component 530 may determine a portion of the environment (e.g., associated with an occlusion grid) to determine whether the portion is "visible" to one or more sensors of the vehicle 502 (e.g., within a field of view and not otherwise occluded by an object). In some instances, the region component 530 may include functionality to project sensor data into map data to determine regions of the map where no data is located. In some instances, the map data may be used to determine that there are regions "outside" the observable regions to determine regions that are occluded regions and regions that are visible regions. In some instances, the region component 530 may dynamically generate an occluded region and/or a visible region based on objects in an environment.

The attribute component 532 may include functionality to determine attribute(s) (also referred to as attribute information) associated with objects, occluded region(s), visible region(s), and/or the like in an environment. In some examples, the attribute component 532 may receive data from the perception component 522 and/or from the map(s) 524 to determine attribute information of objects, occluded region(s), and/or visible region(s) over time. For example, the attribute component 532 may determine the types of object, trajectories of the objects, velocities of the objects, the locations of the occluded regions, the size of the occluded regions, the locations of the visible regions, the size of the visible regions, the velocity of a road for which the vehicle 502 is navigating, and/or the like. The attribute information may be provided to the region component 530 and/or the occupancy prediction component 534 to perform the techniques described herein.

The occupancy prediction component 534 may include functionality to determine an occupancy of a visible region in an environment as described in detail herein such as illustrated and discussed with respect to any of FIGS. 1-4, and 6. For example, the occupancy prediction component 534 may receive data representing an environment including an occluded region and a visible region. Such data may be represented as a top-down representation of the environment, whereby attribute(s) of the vehicle 502, object(s) in the environment, the occluded region(s), the visible region(s), and the like may be represented as image data of a multi-channel image. In some examples, the occupancy prediction component 534 may output a probability that a visible region will be occupied by an object, such as a vehicle or pedestrian, during a future period of time. In some examples, a probability may be based at least in part on heuristic, including but not limited to, a size of a visible region, a size of an occluded region, if an occupancy of the occluded region is known (e.g., based on other sensor data), observing objects entering or exiting the occluded region and/or the visible region, a distance to objects in the environment (e.g., other vehicle or pedestrians, a crosswalk, a building, etc.), a time of day, weather conditions, and the like. In some examples, a probability of an occupancy of a visible region may be represented as a discretized probability distribution, a heat map, and the like.

In some examples, the occupancy prediction component 534 is a machine learned model such as a neural network, a fully connected neural network, a convolutional neural network, a recurrent neural network, and the like.

In some examples, the occupancy prediction component 534 may be trained by reviewing data logs to determine events where visible regions are present in an environment and where data is available to determine an occupancy of the visible region over a future period time by objects not initially detected by the vehicle 502 (e.g., because they were occluded or otherwise). Such events may be identified and attributes may be determined for the object (e.g., a vehicle, a pedestrian, a static object, etc.) and the environment, and data representing the events may be identified as training data. The training data may be input to a machine learning model where a known result (e.g., a ground truth, such as the known "future" attributes) may be used to adjust weights and/or parameters of the machine learning model to minimize an error.

In general, the planning component 536 may determine a path for the vehicle 502 to follow to traverse the environment. For example, the planning component 536 may determine various routes and trajectories and various levels of detail. For example, the planning component 536 may determine a route to travel from a first location (e.g., a current location) to a second location (e.g., a target location). For the purpose of this discussion, a route may be a sequence of waypoints for travelling between two locations. As non-limiting examples, waypoints include streets, intersections, global positioning system (GPS) coordinates, etc. Further, the planning component 536 may generate an instruction for guiding the autonomous vehicle along at least a portion of the route from the first location to the second location. In at least one example, the planning component 536 may determine how to guide the autonomous vehicle from a first waypoint in the sequence of waypoints to a second waypoint in the sequence of waypoints. In some examples, the instruction may be a trajectory, or a portion of a trajectory. In some examples, multiple trajectories may be substantially simultaneously generated (e.g., within technical tolerances) in accordance with a receding horizon technique, wherein one of the multiple trajectories is selected for the vehicle 502 to navigate.

The trajectory generation component 538 may include functionality to generate one or more trajectories for the vehicle 502 to follow to traverse through an environment. In some examples, the trajectory generation component 538 may generate various trajectories corresponding to various actions for the vehicle to perform in an environment. For example, actions may be based at least in part on map data indicating potential drivable surfaces in an environment. By way of example, the actions may include, but are not limited to a "stay in lane" action, a "lane change left" action, a "lane change right" action, a "left turn" action, a "right turn" action, a "traverse around a double-parked vehicle" action, and the like. Of course, any number and type of actions are contemplated herein.

In some examples, the trajectory generation component 538 may generate trajectories based at least in part on a centerline of a road segment. In some examples, the trajectory generation component 538 may generate a trajectory based at least in part on various costs, including but not limited to a reference cost (e.g., a cost associated with generating a trajectory at a distance away from a reference trajectory), an obstacle cost (e.g., a cost associated with a distance from a trajectory to an obstacle in the environment), a steering cost (e.g., associated with maximum steering angles), an acceleration cost (e.g., a cost associated with maximum acceleration and/or braking), and the like. Of course, the trajectory generation component 538 may generate a trajectory based on a variety of factors and is not limited to express examples discussed herein.

The trajectory evaluation component 540 may include functionality to evaluate various trajectories to select a trajectory to control the vehicle 502. In some examples, the trajectory evaluation component 540 may include functionality to determine various score(s), cost(s), metric(s), and the like based at least in part on probabilities associated with one or more visible regions associated with a trajectory, relative percentages, and/or relative weighting therebetween. For example, a trajectory may be evaluated based at least in part on one or more of a risk with respect to a visible region as well as respecting other goals or costs (e.g., maintaining progress towards a waypoint or destination, respecting speed limits (e.g., by not going too slow or too fast), reference cost(s), obstacle cost(s), steering cost(s), acceleration cost(s), and the like).

In some examples, and as discussed herein, a trajectory may be evaluated based at least in part on a probability of collision associated with the trajectory. For example, as a location of the vehicle 502 is evaluated over time with respect to a trajectory, an amount of overlap between a bounding box associated with the vehicle and different prediction probabilities may be determined. In some examples, an amount of overlap may be determined for discrete points and/or times along a trajectory, while in some examples, an amount of overlap may be determined for a plurality of points and/or times along a trajectory. The overlap may be integrated, summed, or otherwise aggregated to determine a probability of a collision associated with the trajectory, and the probability of a collision may be compared with other candidate trajectories to select a trajectory. In some examples, the probability of a collision may be considered as a cost in generating, modifying, or otherwise determining a trajectory for the vehicle to traverse. Examples of evaluating a trajectory are described in U.S. patent application Ser. No. 16/206,877 titled "Probabilistic Risk Assessment for Trajectory Evaluation" filed Nov. 30, 2018. Application Ser. No. 16/206,877 is herein incorporated by reference, in its entirety.

As may be understood, the components discussed herein (e.g., the localization component 520, the perception component 522, the map(s) 524, the system controller(s) 526, the prediction component 528, the region component 530, the occupancy prediction component 534, the attribute component 532, the planning component 536, the trajectory generation component 538, and the trajectory evaluation component 540) are described as divided for illustrative purposes. However, the operations performed by the various components may be combined or performed in any other component. Further, any of the components discussed as being implemented in software may be implemented in hardware, and vice versa. Further, any functionality implemented in the vehicle 502 may be implemented in the computing device(s) 544, or another component (and vice versa).

In at least one example, the sensor system(s) 506 may include time of flight sensors, lidar sensors, radar sensors, ultrasonic transducers, sonar sensors, location sensors (e.g., GPS, compass, etc.), inertial sensors (e.g., inertial measurement units (IMUs), accelerometers, magnetometers, gyroscopes, etc.), cameras (e.g., RGB, IR, intensity, depth, etc.), microphones, wheel encoders, environment sensors (e.g., temperature sensors, humidity sensors, light sensors, pressure sensors, etc.), etc. The sensor system(s) 506 may include multiple instances of each of these or other types of sensors. For instance, the time of flight sensors may include individual time of flight sensors located at the corners, front, back, sides, and/or top of the vehicle 502. As another example, the camera sensors may include multiple cameras disposed at various locations about the exterior and/or interior of the vehicle 502. The sensor system(s) 506 may provide input to the vehicle computing device(s) 504. Additionally or alternatively, the sensor system(s) 506 may send sensor data, via the one or more network(s) 542, to the one or more computing device(s) 544 at a particular frequency, after a lapse of a predetermined period of time, in near real-time, etc.

The vehicle 502 may also include emitter(s) 508 for emitting light and/or sound, as described above. The emitter(s) 508 in this example include interior audio and visual emitters to communicate with passengers of the vehicle 502. By way of example and not limitation, interior emitters may include speakers, lights, signs, display screens, touch screens, haptic emitters (e.g., vibration and/or force feedback), mechanical actuators (e.g., seatbelt tensioners, seat positioners, headrest positioners, etc.), and the like. The emitter(s) 508 in this example also include exterior emitters. By way of example and not limitation, the exterior emitters in this example include lights to signal a direction of travel or other indicator of vehicle action (e.g., indicator lights, signs, light arrays, etc.), and one or more audio emitters (e.g., speakers, speaker arrays, horns, etc.) to audibly communicate with pedestrians or other nearby vehicles, one or more of which comprising acoustic beam steering technology.

The vehicle 502 may also include the communication connection(s) 510 that enable communication between the vehicle 502 and one or more other local or remote computing device(s). For instance, the communication connection(s) 510 may facilitate communication with other local computing device(s) on the vehicle 502 and/or the drive system(s) 514. Also, the communication connection(s) 510 may allow the vehicle to communicate with other nearby computing device(s) (e.g., other nearby vehicles, traffic signals, etc.). The communications connection(s) 510 also enable the vehicle 502 to communicate with a remote teleoperations computing device or other remote services.

The communications connection(s) 510 may include physical and/or logical interfaces for connecting the vehicle computing device(s) 504 to another computing device or a network, such as network(s) 542. For example, the communications connection(s) 510 may enable Wi-Fi-based communication such as via frequencies defined by the IEEE 802.11 standards, short range wireless frequencies such as Bluetooth R, cellular communication (e.g., 2G, 3G, 4G, 4G LTE, 5G, etc.) or any suitable wired or wireless communications protocol that enables the respective computing device to interface with the other computing device(s).

In at least one example, the vehicle 502 may include the drive system(s) 514. In some examples, the vehicle 502 may have a single drive system 514. In at least one example, if the vehicle 502 has multiple drive systems 514, individual drive systems 514 may be positioned on opposite ends of the vehicle 502 (e.g., the front and the rear, etc.). In at least one example, the drive system(s) 514 may include one or more sensor systems to detect conditions of the drive system(s) 514 and/or the surroundings of the vehicle 502. By way of example and not limitation, the sensor system(s) may include one or more wheel encoders (e.g., rotary encoders) to sense rotation of the wheels of the drive modules, inertial sensors (e.g., inertial measurement units, accelerometers, gyroscopes, magnetometers, etc.) to measure orientation and acceleration of the drive module, cameras or other image sensors, ultrasonic sensors to acoustically detect objects in the surroundings of the drive system, lidar sensors, radar sensors, etc. Some sensors, such as the wheel encoders may be unique to the drive system(s) 514. In some cases, the sensor system(s) on the drive system(s) 514 may overlap or supplement corresponding systems of the vehicle 502 (e.g., sensor system(s) 506).

The drive system(s) 514 may include many of the vehicle systems, including a high voltage battery, a motor to propel the vehicle, an inverter to convert direct current from the battery into alternating current for use by other vehicle systems, a steering system including a steering motor and steering rack (which may be electric), a braking system including hydraulic or electric actuators, a suspension system including hydraulic and/or pneumatic components, a stability control system for distributing brake forces to mitigate loss of traction and maintain control, an HVAC system, lighting (e.g., lighting such as head/tail lights to illuminate an exterior surrounding of the vehicle), and one or more other systems (e.g., cooling system, safety systems, onboard charging system, other electrical components such as a DC/DC converter, a high voltage junction, a high voltage cable, charging system, charge port, etc.). Additionally, the drive system(s) 514 may include a drive system controller which may receive and preprocess data from the sensor system(s) and to control operation of the various vehicle systems. In some examples, the drive system controller may include one or more processors and memory communicatively coupled with the one or more processors. The memory may store one or more components to perform various functionalities of the drive system(s) 514. Furthermore, the drive system(s) 514 also include one or more communication connection(s) that enable communication by the respective drive system with one or more other local or remote computing device(s).

In at least one example, the direct connection 512 may provide a physical interface to couple the one or more drive system(s) 514 with the body of the vehicle 502. For example, the direct connection 512 may allow the transfer of energy, fluids, air, data, etc. between the drive system(s) 514 and the vehicle. In some instances, the direct connection 512 may further releasably secure the drive system(s) 514 to the body of the vehicle 502.

In at least one example, the localization component 520, the perception component 522, the map(s) 524, the system controller(s) 526, the prediction component 528, the region component 530, the occupancy prediction component 534, the attribute component 532, the planning component 536, the trajectory generation component 538, and the trajectory evaluation component 540 may process sensor data, as described above, and may send their respective outputs, over the one or more network(s) 542, to one or more computing device(s) 544. In at least one example, the localization component 520, the map(s) 524, the system controller(s) 526, the prediction component 528, the region component 530, the occupancy prediction component 534, the attribute component 532, the planning component 536, the trajectory generation component 538, and the trajectory evaluation component 540 may send their respective outputs to the computing device(s) 544 at a particular frequency, after a lapse of a predetermined period of time, in near real-time, etc.

In some examples, the vehicle 502 may send sensor data to the computing device(s) 544 via the network(s) 542. In some examples, the vehicle 502 may send raw sensor data to the computing device(s) 544. In other examples, the vehicle 502 may send processed sensor data and/or representations of sensor data to the computing device(s) 544. In some examples, the vehicle 502 may send sensor data to the computing device(s) 544 at a particular frequency, after a lapse of a predetermined period of time, in near real-time, etc. In some cases, the vehicle 502 may send sensor data (raw or processed) to the computing device(s) 544 as one or more log files.

The computing device(s) 544 may include processor(s) 546 and a memory 548 storing a training component 550.

In some instances, the training component 550 may include functionality to train one or more models to determine prediction probabilities, as discussed herein. In some instances, the training component 550 may communicate information generated by the one or more models to the vehicle computing device(s) 504 to revise how to control the vehicle 502 in response to different situations.

For example, the training component 550 may train one or more machine learning models to generate the prediction component(s) discussed herein. In some examples, the training component 550 may include functionality to search data logs and determine attribute(s) (e.g., in any one or more reference frames) associated with object(s). Log data that corresponds to particular scenarios (e.g., a vehicle traversing an environment comprising an occluded region) may represent training data. The training data may be input to a machine learning model where a known result (e.g., a ground truth, such as the known "future" attributes, such as whether a visible region was occupied by an object, that was previous undetected, over a future period of time)) may be used to adjust weights and/or parameters of the machine learning model to minimize an error.

For instance, aspects of some or all of the components discussed herein may include any models, algorithms, and/or machine learned algorithms. For example, in some instances, the components in the memory 548 (and the memory 518, discussed above) may be implemented as a neural network. In some examples, the training component 550 may utilize a neural network to generate and/or execute one or more models to determine segmentation information from sensor data, as discussed herein.

As described herein, an exemplary neural network is a biologically inspired algorithm which passes input data through a series of connected layers to produce an output. Each layer in a neural network may also comprise another neural network, or may comprise any number of layers (whether convolutional or not). As may be understood in the context of this disclosure, a neural network may utilize machine learning, which may refer to a broad class of such algorithms in which an output is generated based on learned parameters.

Although discussed in the context of neural networks, any type of machine learning may be used consistent with this disclosure. For example, machine learning or machine learned algorithms may include, but are not limited to, regression algorithms (e.g., ordinary least squares regression (OLSR), linear regression, logistic regression, stepwise regression, multivariate adaptive regression splines (MARS), locally estimated scatterplot smoothing (LOESS)), instance-based algorithms (e.g., ridge regression, least absolute shrinkage and selection operator (LASSO), elastic net, least-angle regression (LARS)), decisions tree algorithms (e.g., classification and regression tree (CART), iterative dichotomiser 3 (ID3), Chi-squared automatic interaction detection (CHAID), decision stump, conditional decision trees), Bayesian algorithms (e.g., naïve Bayes, Gaussian naïve Bayes, multinomial naïve Bayes, average one-dependence estimators (AODE), Bayesian belief network (BNN), Bayesian networks), clustering algorithms (e.g., k-means, k-medians, expectation maximization (EM), hierarchical clustering), association rule learning algorithms (e.g., perceptron, back-propagation, hopfield network, Radial Basis Function Network (RBFN)), deep learning algorithms (e.g., Deep Boltzmann Machine (DBM), Deep Belief Networks (DBN), Convolutional Neural Network (CNN), Stacked Auto-Encoders), Dimensionality Reduction Algorithms (e.g., Principal Component Analysis (PCA), Principal Component Regression (PCR), Partial Least Squares Regression (PLSR), Sammon Mapping, Multidimensional Scaling (MDS), Projection Pursuit, Linear Discriminant Analysis (LDA), Mixture Discriminant Analysis (MDA), Quadratic Discriminant Analysis (QDA), Flexible Discriminant Analysis (FDA)), Ensemble Algorithms (e.g., Boosting, Bootstrapped Aggregation (Bagging), AdaBoost, Stacked Generalization (blending), Gradient Boosting Machines (GBM), Gradient Boosted Regression Trees (GBRT), Random Forest), SVM (support vector machine), supervised learning, unsupervised learning, semi-supervised learning, etc.

Additional examples of architectures include neural networks such as ResNet50, ResNet101, VGG, DenseNet, PointNet, and the like.

The processor(s) 516 of the vehicle 502 and the processor(s) 546 of the computing device(s) 544 may be any suitable processor capable of executing instructions to process data and perform operations as described herein. By way of example and not limitation, the processor(s) 516 and 546 may comprise one or more Central Processing Units (CPUs), Graphics Processing Units (GPUs), or any other device or portion of a device that processes electronic data to transform that electronic data into other electronic data that may be stored in registers and/or memory. In some examples, integrated circuits (e.g., ASICs, etc.), gate arrays (e.g., FPGAs, etc.), and other hardware devices may also be considered processors in so far as they are configured to implement encoded instructions.

Memory 518 and 548 are examples of non-transitory computer-readable media. The memory 518 and 548 may store an operating system and one or more software applications, instructions, programs, and/or data to implement the methods described herein and the functions attributed to the various systems. In various implementations, the memory may be implemented using any suitable memory technology, such as static random access memory (SRAM), synchronous dynamic RAM (SDRAM), nonvolatile/Flash-type memory, or any other type of memory capable of storing information. The architectures, systems, and individual elements described herein may include many other logical, programmatic, and physical components, of which those shown in the accompanying figures are merely examples that are related to the discussion herein.

It should be noted that while FIG. 5 is illustrated as a distributed system, in alternative examples, components of the vehicle 502 may be associated with the computing device(s) 544 and/or components of the computing device(s) 544 may be associated with the vehicle 502. That is, the vehicle 502 may perform one or more of the functions associated with the computing device(s) 544, and vice versa. Further, aspects of the prediction component 528 (and subcomponents) may be performed on any of the devices discussed herein.

Figure 6:
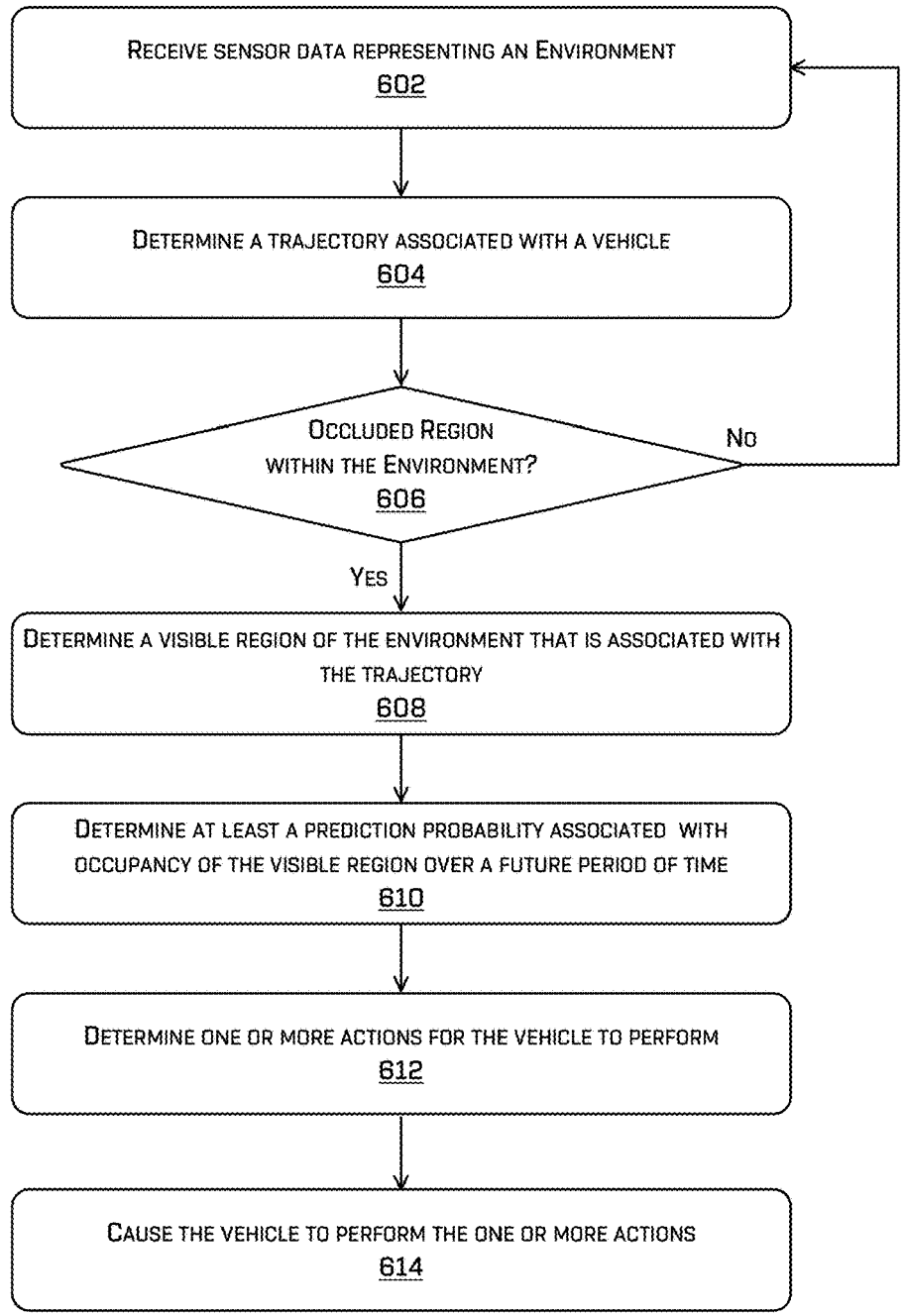
FIG. 6 depicts an example process for determining at least a prediction probability for a visible region of an environment and then determining one or more actions for a vehicle to perform based on the prediction probability, in accordance with embodiments of the disclosure.
Figure 7:
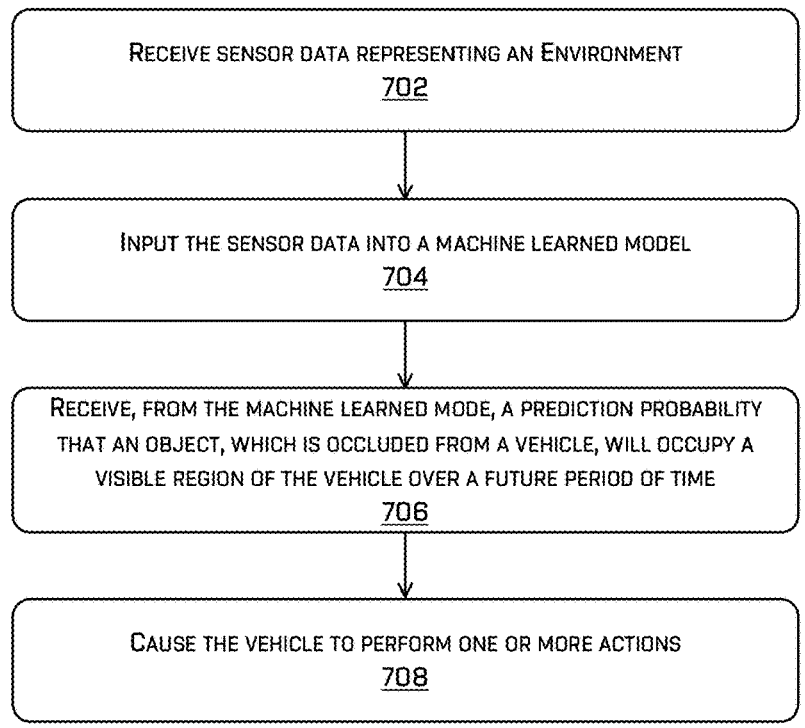
FIG. 7 depicts another example process for determining at least a prediction probability for a visible region of an environment and then determining one or more actions for a vehicle to perform based on the prediction probability, in accordance with embodiments of the disclosure.
Figure 8:
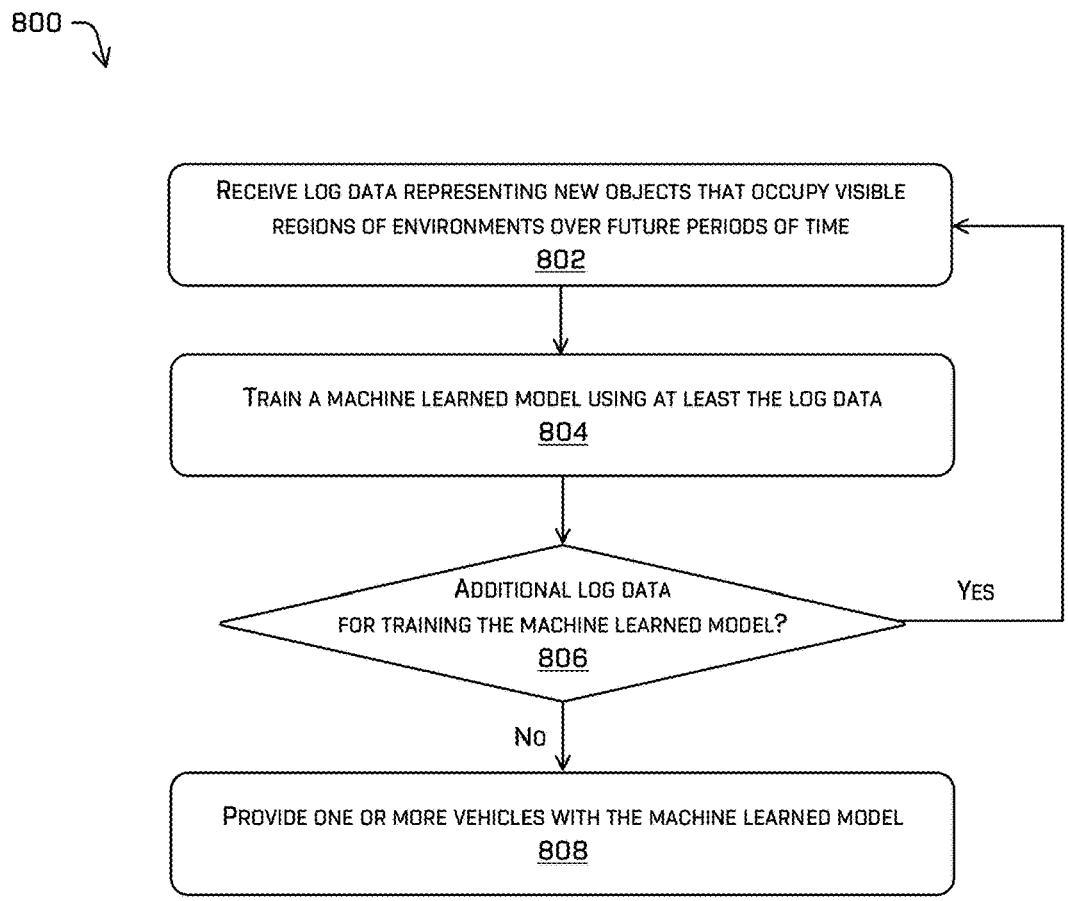
FIG. 8 depicts an example process for training a machine learned model for predicting occupancy within a visible region of an environment over a future period of time, in accordance with embodiments of the disclosure.

FIGS. 6-8 illustrate example processes in accordance with embodiments of the disclosure. These processes are illustrated as logical flow graphs, each operation of which represents a sequence of operations that may be implemented in hardware, software, or a combination thereof. In the context of software, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described operations may be combined in any order and/or in parallel to implement the processes.

FIG. 6 depicts an example process 600 for determining at least a prediction probability for a visible region of an environment and then determining one or more actions for a vehicle based on the prediction probability, in accordance with embodiments of the disclosure. At operation 602, the process 600 may include receiving sensor data representing an environment. For instance, the vehicle 502 may use one or more sensors to generate the sensor data. The sensor data may represent the environment for which the vehicle 502 is navigating. For instance, the sensor data may represent at least one or more objects located within the environment.

At operation 604, the process 600 may include determining a trajectory associated with a vehicle. For instance, the vehicle 502 may determine the trajectory for the vehicle 502 to navigate within the environment. In some instances, the trajectory may represent one or more actions for the vehicle to follow. Examples of the one or more actions may include, but are not limited to, staying in a lane, changing to a new lane, reducing the acceleration of the vehicle 502, reducing the velocity of the vehicle 502, maintaining the acceleration of the vehicle 502, maintaining the velocity of the vehicle 502, increasing the acceleration of the vehicle 502, increasing the velocity of the vehicle 502, stopping the vehicle 502, and/or any other action that a vehicle may perform.

At operation 606, the process 600 may include determining whether an occluded region within the environment. For instance, the vehicle 502 may analyze the sensor data to determine the occluded region. In some examples, the vehicle 502 may determine the occluded region within the environment using a location of an object, where the occluded region is occluded by the object. In some instances, the occluded region may include one or more objects that the vehicle has yet to detect within the environment. If, at operation 606, it is determined that there is not the occluded region associated with the object, then the process 602 may repeat starting back at operation 602.

However, if, at operation 606, it is determined that that there is the occluded region associated with the object, then at operation 608, the process 600 may include determining a visible region of the environment that is associated with the trajectory. For instance, the vehicle 502 may analyze the sensor data in order to determine the visible region within the environment. In some instances, the visible region is located along the trajectory of the vehicle 502. In some instances, the visible region is located next to the occluded region within the environment. In other words, the visible region may include a region of the environment for which object(s) that may be located within the occluded region are able to navigate over a future period of time.

At operation 610, the process 600 may include determining at least a prediction probability associated with occupancy of the visible region over a future period of time. For instance, the vehicle 502 may determine the prediction probability associated with the occupancy of the visible region over the future period of time. In some instances, the vehicle 502 makes the determination by inputting data into a machine learned model. The data may represent one or more of the top-down representation of the environment, a location of the visible region, a location of the occluded region, a location of an object within the environment, a velocity associated with the object, a velocity associated with the autonomous vehicle, a speed associated with a road that the autonomous vehicle is navigating, weather conditions, a time of day, month, year, etc., and/or any other information.

In some instances, the output from the machine learned model may include a heatmap associated with the visible region. The heatmap may indicate probabilities that object(s) will be located at various portions of the visible region over the future period of time.

At operation 612, the process 600 may include determining one or more actions for the vehicle to perform and at operation 614, the process 600 may include causing the vehicle to perform the one or more actions. For instance, the vehicle 502 may determine the one or more actions based on the probability. The one or more actions may include, but are not limited to, continuing along the trajectory, changing the trajectory, reducing the acceleration of the vehicle 502, reducing the velocity of the vehicle 502, maintaining the acceleration of the vehicle 502, maintaining the velocity of the vehicle 502, increasing the acceleration of the vehicle 502, increasing the velocity of the vehicle 502, stopping the vehicle 502, and/or any other action that a vehicle may perform. The vehicle 502 may then perform the one or more actions.

FIG. 7 depicts another example process for determining at least a prediction probability for a visible region of an environment and then determining one or more actions for a vehicle to perform based on the prediction probability, in accordance with embodiments of the disclosure. At operation 702, the process 700 may include receiving sensor data representing an environment. For instance, the vehicle 502 may use one or more sensors to generate the sensor data. The sensor data may represent the environment for which the vehicle 502 is navigating. For instance, the sensor data may represent at least one or more objects located within the environment.

At operation 704, the process 700 may include inputting the sensor data into a machine learned model. For instance, the vehicle 504 may input the sensor data into the machine learned model. In some instances, the sensor data may represent one or more of a top-down representation of the environment, the occlusion region(s), the visible region(s), attribute(s) associated with the environment (e.g., location(s) of object(s) within the environment, velocity(ies) associated with the object(s), a speed limit associated with the road the autonomous vehicle is navigating, etc.), attribute(s) associated with the autonomous vehicle (e.g., a location of the autonomous vehicle, a velocity associated with the autonomous vehicle, and acceleration associated with the autonomous vehicle, etc.), weather conditions, a type of roadway that the autonomous vehicle is navigating (e.g., a freeway, a parking lot, a downtown road, etc.) a time of day, month, year, etc., and/or any other information.

At operation 706, the process 700 may include receiving, from the machine learned mode, a prediction probability that an object, which is occluded from the vehicle, will occupy a visible region of the vehicle over a future period of time. For instance, the vehicle 502 may receive the prediction probability from the machine learned model. In some instances, the vehicle 502 may receive a heat map that represents prediction probabilities associated with the visible region.

At operation 708, the process 700 may include causing the vehicle to perform one or more actions. For instance, the vehicle 502 may determine the one or more actions based on the prediction probability. The one or more actions may include, but are not limited to, continuing along the trajectory, changing the trajectory, reducing the acceleration of the vehicle 502, reducing the velocity of the vehicle 502, maintaining the acceleration of the vehicle 502, maintaining the velocity of the vehicle 502, increasing the acceleration of the vehicle 502, increasing the velocity of the vehicle 502, stopping the vehicle 502, and/or any other action that a vehicle may perform. The vehicle 502 may then perform the one or more actions.

FIG. 8 depicts an example process 800 for training a machine learned model for predicting occupancy within a visible region over a future period of time, in accordance with embodiments of the disclosure. At operation 802, the process 800 may include receiving log data representing new objects that occupy visible regions of environments over future periods of time. For instance, in some examples, the computing device(s) 544 may receive the log data from one or more vehicles. In other examples, the computing device(s) 544 may artificially generate the log data. The log data may represent at least visible regions within the environments at initial times and how new objects, that were not initially detected by the one or more vehicles, occupy the visible regions over the future periods of time.

At operation 804, the process 800 may include training a machine learned model using at least the log data. For instance, the computing device(s) may train the machine learned model using the log data. In some instances, the computing device(s) may further train the machine learned model by inputting know results (e.g., ground truth) associated with the log data. Furthermore, in some instances, the computing device(s) may train the machine learned model using one or more assumptions associated with the new objects. Training the machine learned model may include adjusting weights and/or parameters of the machine learned model in order to minimize an error.

At operation 806, the process 800 may include determining whether there is additional log data for training the machine learned model. For instance, the computing device(s) 544 may determine if there is additional log data that the computing device(s) may use to further train the machine learned model. If, at operation 806, it is determined that there is the additional log data to train the machine learned mode, then the process 800 may repeat back at operation 802. For instance, if the computing device(s) 544 determine that there is the additional log data to train the machine learned model, then the computing device(s) may further train the machine learned model using the additional log data.

However, if, at operation 706, it is determined that there is no more additional log data to train the machine learned mode, the, at operation 708, the process 700 may include providing one or more vehicles with the machine learned model. For instance, if the computing device(s) 544 determine that there is no more additional log data to train the machine learned model, then the computing device(s) 544 may provide the one or more vehicles with the machine learned model. In some instances, after providing the machine learned model, the computing device(s) may still receive additional log data from the one or more vehicles and use the additional log data to further train the machine learned model.

Example Clauses

A: An autonomous vehicle comprising: a sensor: one or more processors; and one or more computer-readable media storing instructions that, when executed by the one or more processors, cause the one or more processors to perform operations comprising: receiving sensor data from the sensor representing a visible region of an environment and excluding an occluded region of the environment: inputting a first portion of the sensor data associated with the occluded region and a second portion of the sensor data associated with the visible region into a machine learned model: receiving, from the machine learned model, prediction probabilities associated with an object associated with the occluded region, the prediction probabilities indicative of the object occupying the visible region during a future period of time: determining, based at least in part on the prediction probabilities, an action for the autonomous vehicle to perform; and controlling the autonomous vehicle to perform the action.

B: The autonomous vehicle as recited in paragraph A, the operations further comprising: representing the environment as top-down image data representing the occluded region and the visible region, and wherein inputting the first portion of the sensor data representing the occluded region and the second portion of the sensor data representing the visible region into the machine learned model comprises inputting the top-down image data into the machine learned model.

C: The autonomous vehicle as recited in either paragraph A or paragraph B, wherein the prediction possibilities comprise at least: a first prediction probability that the object will be located at a first portion of the visible region during the future period of time; and a second prediction probability that the object will be located at a second portion of the visible region during the future period of time.

D: The autonomous vehicle as recited in any of paragraphs A-C, wherein the sensor data further represents at least one of: the location of the object within the environment: an object classification associated with the object: a velocity associated with the object: a velocity associated with the autonomous vehicle: a speed associated with a road that the autonomous vehicle is navigating: a time of day: a classification of an event within the environment: a classification of the environment: a type of roadway that the autonomous vehicle is navigating: or current weather conditions.

E: The autonomous vehicle as recited in any of paragraphs A-D, the operations further comprising: determining, based at least in part on the sensor data, an additional location of an additional object in the environment, the additional object being located within the visible region: determining, based at least in part on the sensor data, an additional trajectory of the additional object; and inputting, into the machine learned mode, third data representing the additional location of the additional object and fourth data representing the additional trajectory of the additional object.

F: A method comprising: receiving sensor data generated by a sensor associated with a vehicle, the sensor data representing an environment: inputting the sensor data into a machine learned model: receiving, from the machine learned model, a prediction probability associated with an object occluded from the sensor at a current time, the prediction probability indicative of the object occupying a portion of a visible region of the vehicle during a future period of time; and causing the vehicle to perform an action based at least in part on the prediction probability.

G: The method as recited in paragraph F, further comprising: representing the environment as top-down image data representing an occluded region of the environment and the visible region; and inputting the top-down image data into the machine learned model.

H: The method as recited in paragraph G, further comprising: representing the environment as an additional top-down image data representing the occluded region and the visible region at a time prior to the current time; and inputting the additional top-down image data into the machine learned model.

I: The method as recited in any of paragraphs F-H, further comprising inputting into the machine learned model first data representing an occluded region and second data representing the visible region.

J: The method as recited in any of paragraphs F-I, wherein the sensor data represents at least one of: a location of the object within the environment: an object classification associated with the object: a velocity associated with the object: a velocity associated with the vehicle: a speed associated with a road that the vehicle is navigating: a time of day: a type of roadway that the autonomous vehicle is navigating: or current weather conditions.

K: The method as recited in any of paragraphs F-J, further comprising receiving, from the machine learned model, an additional prediction probability associated the object occupying an additional portion of the visible region over the future period of time, the additional prediction probability being different than the prediction probability.

L: The method as recited in any of paragraphs F-K, further comprising: determining, based at least in part on the sensor data, a location of the object within the environment: determining an occluded region of the environment based at least in part on the location of the object; and determining the visible region of the environment based at least in part on the occluded region.

M: The method as recited in any of paragraphs F-L, further comprising: receiving map data associated with the environment: performing a ray casting operation; and determining the visible region of the environment based at least in part on the map data and the ray casting operation.

N: The method as recited in any of paragraphs F-M, further comprising: determining a trajectory of the vehicle, wherein the portion of the visible region is located along the trajectory of the object.

O: The method as recited in any of paragraphs F-N, wherein causing the vehicle to perform the action comprises causing the vehicle to perform at least one of: continuing along a trajectory of the vehicle: changing a trajectory of the vehicle such that visible region is altered: changing a velocity of the vehicle: changing an acceleration of the vehicle: or causing the vehicle to stop.

P: One or more non-transitory computer-readable media storing instructions that, when executed by one or more processors, cause the one or more processors to perform operations comprising: receiving, from a sensor, sensor data representing an environment: inputting the sensor data into a machine learned model: receiving, from the machine learned model, a prediction probability associated with an object, which may be occluded from a vehicle, the prediction probability indicative of the object occupying a portion of a visible region of the vehicle during a future period of time; and causing the vehicle to perform an action based at least in part on the prediction probability.

Q: The one or more non-transitory computer-readable media as recited in paragraph P, the operations further comprising: determining a location of an additional object: determining an occluded region of the environment based at least in part on the location of the additional object; and inputting data representing the occluded region into the machine learned model.

R: The one or more non-transitory computer-readable media as recited in either paragraph P or paragraph R, the operations further comprising: representing the environment as top-down image data representing the visible region; and inputting the top-down image data into the machine learned model.

S: The one or more non-transitory computer-readable media as recited in any of paragraphs P-R, the operations further comprising: receiving map data associated with the environment; and determining the visible region of the environment based at least in part on the map data and a ray casting operation.

T: The one or more non-transitory computer-readable media as recited in any of paragraphs P-S, wherein the sensor data represents at least one of: a location of the object within the environment: an object classification associated with the object: a velocity associated with the object: a velocity associated with the vehicle: a speed associated with a road that the vehicle is navigating: a time of day: a type of roadway that the autonomous vehicle is navigating: or current weather conditions.

CONCLUSION

While one or more examples of the techniques described herein have been described, various alterations, additions, permutations and equivalents thereof are included within the scope of the techniques described herein.

In the description of examples, reference is made to the accompanying drawings that form a part hereof, which show by way of illustration specific examples of the claimed subject matter. It is to be understood that other examples can be used and that changes or alterations, such as structural changes, can be made. Such examples, changes or alterations are not necessarily departures from the scope with respect to the intended claimed subject matter. While the steps herein can be presented in a certain order, in some cases the ordering can be changed so that certain inputs are provided at different times or in a different order without changing the function of the systems and methods described. The disclosed procedures could also be executed in different orders. Additionally, various computations that are herein need not be performed in the order disclosed, and other examples using alternative orderings of the computations could be readily implemented. In addition to being reordered, the computations could also be decomposed into sub-computations with the same results.

What is claimed is:

1. An autonomous vehicle comprising:
   a plurality of sensors;
   one or more processors; and
   one or more computer-readable media storing instructions that, when executed by the one or more processors, cause the one or more processors to perform operations comprising:
   receiving, from the plurality of sensors, sensor data representing an environment of the autonomous vehicle at near real-time, the environment comprising:
      a visible region that is visible to a first sensor of the plurality of sensors that is associated with a first sensor modality and a second sensor of the plurality of sensors that is associated with a second sensor modality, wherein the first sensor modality is different from the second sensor modality; and
      an occluded region that is occluded to the first sensor and visible to the second sensor;
   inputting a first portion of the sensor data associated with the occluded region and a second portion of the sensor data associated with the visible region into a machine learned model, wherein:

the second portion comprises an output of the second sensor from the occluded region, the machine learned model is trained based on first log data and second log data, the first log data represents:
   a second visible region at a first past time, and
   that a previously undetected object was first detected to be present at the second visible region at a second past time, wherein the second past time is after the first past time, and the second log data is generated by:
   receiving third log data captured by at least one of the autonomous vehicle or a second vehicle, the third log data representing a third visible region, and
   artificially occluding the third visible region, comprising artificially occluding an object in the third visible region;

receiving, from the machine learned model, prediction probabilities associated with an occluded object at near real-time, the prediction probabilities indicative of the occluded object occupying the visible region during a future period of time;

determining, based at least in part on the prediction probabilities, an action for the autonomous vehicle to perform; and controlling the autonomous vehicle to perform the action.

2. The autonomous vehicle as recited in claim 1, the operations further comprising:
representing the environment as top-down image data representing the occluded region and the visible region, and
wherein inputting the first portion of the sensor data representing the occluded region and the second portion of the sensor data representing the visible region into the machine learned model comprises inputting the top-down image data into the machine learned model.

3. The autonomous vehicle as recited in claim 1, wherein the prediction probabilities comprise at least:
a first prediction probability that the occluded object will be located at a first portion of the visible region during the future period of time; and
a second prediction probability that the occluded object will be located at a second portion of the visible region during the future period of time.

4. The autonomous vehicle as recited in claim 1, wherein the sensor data further represents at least one of:
a location of the occluded object within the environment;
an object classification associated with the occluded object;
a velocity associated with the occluded object;
a velocity associated with the autonomous vehicle;
a speed associated with a road that the autonomous vehicle is navigating;
a time of day;
a classification of an event within the environment;
a classification of the environment;
a type of roadway that the autonomous vehicle is navigating; or
current weather conditions.

5. The autonomous vehicle as recited in claim 1, the operations further comprising:
determining, based at least in part on the sensor data, an additional location of an additional object in the environment, the additional object being located within the visible region;
determining, based at least in part on the sensor data, an additional trajectory of the additional object; and
inputting, into the machine learned model, third data representing the additional location of the additional object and fourth data representing the additional trajectory of the additional object.

6. A method comprising:
receiving, as an output of a sensor associated with a vehicle, sensor data, the sensor data representing an environment of the vehicle at near real-time and comprising a first portion that is associated with a visible region of the environment and a second portion that is associated with an occluded region of the environment;
inputting the first portion and the second portion into a machine learned model, wherein:
   the machine learned model is trained based on first log data and second log data,
   the second log data represents:
      a second visible region at a first past time, and
      that a previously undetected object was first detected to be present at the second visible region at a second past time, wherein the second past time is after the first past time, and
   the second log data is generated by:
      receiving third log data captured by at least one of the vehicle or a second vehicle, the third log data representing a third visible region, and
      artificially occluding the third visible region, comprising artificially occluding an object in the third visible region;
receiving, from the machine learned model, a prediction probability associated with an occluded object at near real-time, the prediction probability indicative of the occluded object occupying a portion of the visible region during a future period of time; and
causing the vehicle to perform an action based at least in part on the prediction probability.

7. The method as recited in claim 6, further comprising:
representing the environment as top-down image data representing the occluded region of the environment and the visible region; and
inputting the top-down image data into the machine learned model.

8. The method as recited in claim 7, further comprising:
representing the environment as an additional top-down image data representing the occluded region and the visible region at a time prior to a current time; and
inputting the additional top-down image data into the machine learned model.

9. The method as recited in claim 6, further comprising inputting, into the machine learned model, first data representing the occluded region and second data representing the visible region.

10. The method as recited in claim 6, wherein the sensor data represents at least one of:
a location of the occluded object within the environment;
an object classification associated with the occluded object;
a velocity associated with the occluded object;
a velocity associated with the vehicle;
a speed associated with a road that the vehicle is navigating;
a time of day;
a type of roadway that the vehicle is navigating; or
current weather conditions.

11. The method as recited in claim 6, further comprising receiving, from the machine learned model, an additional prediction probability associated with the occluded object occupying an additional portion of the visible region over the future period of time, the additional prediction probability being different than the prediction probability.

12. The method as recited in claim 6, further comprising:
determining, based at least in part on the sensor data, a location of the occluded object within the environment;
determining an occluded region of the environment based at least in part on the location of the occluded object; and
determining the visible region of the environment based at least in part on the occluded region.

13. The method as recited in claim 6, further comprising:
receiving map data associated with the environment;
performing a ray casting operation; and
determining the visible region of the environment based at least in part on the map data and the ray casting operation.

14. The method as recited in claim 6, further comprising:
determining a trajectory of the vehicle,
wherein the portion of the visible region is located along the trajectory of the vehicle.

15. The method as recited in claim 6, wherein causing the vehicle to perform the action comprises causing the vehicle to perform at least one of:
continuing along a trajectory of the vehicle;
changing a trajectory of the vehicle such that a visible region is altered;
changing a velocity of the vehicle;
changing an acceleration of the vehicle; or
causing the vehicle to stop.

16. One or more non-transitory computer-readable media storing instructions that, when executed by one or more processors, cause the one or more processors to perform operations comprising:
receiving, as an output of a sensor associated with a vehicle, sensor data, the sensor data representing an environment of the vehicle at near real-time, the sensor data comprising a first portion that is associated with a visible region of the environment and a second portion that is associated with an occluded region of the environment;
inputting the first portion and the second portion into a machine learned model, wherein:
the machine learned model is trained based on first log data and second log data,
the first log data represents:
a second visible region at a first past time, and
that a previously undetected object was first detected to be present at the second visible region at a second past time, wherein the second past time is after the first past time, and
the second log data is generated by:
receiving third log data captured by at least one of the vehicle or a second vehicle, the third log data representing a third visible region, and
artificially occluding the third visible region, comprising artificially occluding an object in the third visible region;
receiving, from the machine learned model, a prediction probability associated with an occluded object at near real-time, the prediction probability indicative of the occluded object occupying a portion of the visible region during a future period of time; and
causing the vehicle to perform an action based at least in part on the prediction probability.

17. The one or more non-transitory computer-readable media as recited in claim 16, the operations further comprising:
determining a location of an additional object;
determining the occluded region of the environment based at least in part on the location of the additional object; and
inputting data representing the occluded region into the machine learned model.

18. The one or more non-transitory computer-readable media as recited in claim 16, the operations further comprising:
representing the environment as top-down image data representing the visible region; and
inputting the top-down image data into the machine learned model.

19. The one or more non-transitory computer-readable media as recited in claim 16, the operations further comprising:
receiving map data associated with the environment; and
determining the visible region of the environment based at least in part on the map data and a ray casting operation.

20. The one or more non-transitory computer-readable media as recited in claim 16, wherein the sensor data represents at least one of:
a location of the occluded object within the environment;
an object classification associated with the occluded object;
a velocity associated with the occluded object;
a velocity associated with the vehicle;
a speed associated with a road that the vehicle is navigating;
a time of day;
a type of roadway that the vehicle is navigating; or
current weather conditions.

* * * * *